US011356792B2

(12) United States Patent
Zhang et al.

(10) Patent No.: US 11,356,792 B2
(45) Date of Patent: Jun. 7, 2022

(54) SELECTING A PRIMARY SOURCE OF TEXT TO SPEECH BASED ON POSTURE

(71) Applicant: INTERNATIONAL BUSINESS MACHINES CORPORATION, Armonk, NY (US)

(72) Inventors: Da Wei Zhang, Beijing (CN); Ke Chen, Beijing (CN); Yu Ping Sun, Beijing (CN); Hou Ping Jia, Beijing (CN); Xiaoguang Mo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 16/910,765

(22) Filed: Jun. 24, 2020

(65) Prior Publication Data

US 2021/0409891 A1 Dec. 30, 2021

(51) Int. Cl.
*H04S 7/00* (2006.01)
*G06F 3/01* (2006.01)
(Continued)

(52) U.S. Cl.
CPC .............. *H04S 7/303* (2013.01); *G06F 3/012* (2013.01); *G10L 13/033* (2013.01); *G10L 13/047* (2013.01)

(58) Field of Classification Search
CPC ....... H04S 7/303; G06F 3/012; G10L 13/033; G10L 13/047
See application file for complete search history.

(56) References Cited

U.S. PATENT DOCUMENTS 6,199,076 B1 3/2001 Logan et al.
9,218,122 B2 12/2015 Thomas et al.
(Continued)

FOREIGN PATENT DOCUMENTS

CN 1788305 B 6/2006
CN 105027206 11/2012
(Continued)

OTHER PUBLICATIONS

Jin et al., "Real-time, head-tracked 3D audio with unlimited simultaneous sounds", Proceedings of ICAD 05—Eleventh meeting of the International Conference on Auditory Display, May 31, 2014, 5 pages.
(Continued)

*Primary Examiner* — David L Ton
(74) *Attorney, Agent, or Firm* — Erika R. DeCosty

(57) ABSTRACT

A computer converts each content sources from textual content to speech comprising a separate audio selection. The computer applies, to each audio selection, one or more speech attributes to specify the audio attributes that select a respective position of the respective audio selection from among multiple positions within a multidimensional sound space and audibly distinguish one or more characteristics of the respective audio selection from other audio selections, wherein the respective position of the respective audio selection reflects a rank of the respective audio selection as ordered by interest to a user. The computer outputs a simultaneous stream of the multiple audio selections to an audio output device for stereo play of the audio selections within the multiple positions within the multidimensional sound space to the user, with the multiple positions reflecting the content sources ordered by interest.

20 Claims, 9 Drawing Sheets

(51) Int. Cl.
*G10L 13/047* (2013.01)
*G10L 13/033* (2013.01)

(56) References Cited

U.S. PATENT DOCUMENTS

| | | | |
|---|---|---|---|
| 10,607,463 B2 | 3/2020 | Pan | |
| 10,764,706 B2* | 9/2020 | Sandler | H04S 7/303 |
| 11,070,916 B2* | 7/2021 | Horrocks | H04R 3/12 |
| 2007/0027691 A1 | 2/2007 | Brenner | |
| 2011/0058662 A1* | 3/2011 | Yoakum | H04M 3/568 379/202.01 |
| 2015/0296086 A1* | 10/2015 | Eckert | H04M 3/568 381/17 |
| 2018/0139565 A1* | 5/2018 | Norris | H04S 7/304 |
| 2021/0142783 A1* | 5/2021 | Kim | G10L 13/033 |
| 2021/0343269 A1* | 11/2021 | Sathsahayaraman | H04L 51/18 |

FOREIGN PATENT DOCUMENTS

| | | |
|---|---|---|
| CN | 104485100 A | 4/2015 |
| CN | 105991847 A | 10/2016 |
| CN | 107993134 A | 5/2018 |
| CN | 108228705 A | 6/2018 |
| WO | 2004111997 A1 | 12/2004 |

OTHER PUBLICATIONS

Ma et al., "Exploiting deep neural networks and head movements for binaural localisation of multiple speakers in reverberant conditions", 16th Annual Conference on the International Speech Communication Association, Sep. 2015, 5 pages.

International Search Report and Written Opinion, International Application No. PCT/IB2021/055065, International Filing Date Sep. 13, 2021.

* cited by examiner

SELECTING A PRIMARY SOURCE OF TEXT TO SPEECH BASED ON POSTURE

BACKGROUND

1. Technical Field

One or more embodiments of the invention relate generally to data processing and particularly to selecting a primary source of text to speech based on posture.

2. Description of the Related Art

Many computing devices support text to speech technology that translates textual content into speech that is output through a speaker or other audio output device. When a user opens a website that includes multiple items of textual content aggregated from multiple sources, such as a news website or search engine results, and selects to listen to the textual content from that website using a text to speech converted, a text to speech converter starts converting text into speech from a single text string within the website. Requiring a user to individually listen to speech converted from each item of textual content visible in a website, one by one, in order to find topics that interest the user, is less efficient than the user visually scanning the website, quickly able to scan over keywords in different headlines or other text of multiple textual content items simultaneously displayed in one page, and quickly determine which textual content items to focus in on and read in full.

U.S. Pat. No. 6,199,076 to Logan et al. describes an audio program player that "automatically plays a predetermined schedule of audio program segments" and which supports a user "to listen if desired to an audio speech announcement describing each segment before it is played, and to skip the forward or backward to the next to prior announcement, thereby immediately obtaining the information needed to determine whether a given segment is or is not of interest." In addition, Logan et al. describes a feature of identifying one or more discrete passages within any program segment as being a "highlight," and the player incorporates means operative within the player is placed in a "play highlights" mode for skipping those portions of the content which are not highlights, thus enabling the listener to review only the key points of a presentation, or to more rapidly locate particular passages on interest within the body of a particular program." In addition, Logan et al. describes "information which is available in text form from news sources, libraries, etc. may be converted to compressed audio form either by human readers or by conventional speech synthesis. If speech synthesis is used, the conversion of text to speech is preferably performed at the client station 103 by the player." However, Logan et al.'s audio program player still requires a user to listen to an audio speech announcement about a segment or a highlight from a segment converted from text to speech, one by one, which is not as efficient as a user being able to quickly visually scan through a display of multiple textual content items simultaneously displayed in one page and select a particular textual content item to further examine.

"Real-time, head-tracked 3D audio with unlimited simultaneous sounds" by Craig Jin describes "[a] novel method for 3D audio playback for an unlimited number of simultaneous sound sources and with real-time head-tracking was presented. By performing the 3D audio processing offline, an unlimited number of simultaneous sound sources can be spatially rendered. By rendering binaural sound tracks for a fixed and closed-spaced set of head orientations, smooth playback with real-time head-tracking was achieved." However, Jin's 3D audio playback for an unlimited number of simultaneous sound sources is limited to being pre-loaded with existing audio sources that are the soundtrack to a film, and does not identify or convert any content sources from text to speech. In addition, Jin's 3D audio playback for an unlimited number of simultaneous sound sources does not provide for tuning the sound sources to enable a user to quickly scan all the simultaneous sound sources and then select to focus in one sound source.

As the number of online aggregated content providers continue to increase, there is a need for a method, system, and computer program to support improved efficiency of a user scanning multiple text content items from a content aggregator when the text content items are converted from text to speech. In addition, as the prevalence of stereo headphones and speakers for listening to multidimensional audio increases, there is a need for a method, system, and computer program product to support improved tuning of source sources for output in a multidimensional sound space to facilitate a user listening to multiple sound sources simultaneously to identify a topic that is of interest to the user from among the sound sources, and then selectively adjusting the output characteristics of a particular sound source to facilitate focused listening of the particular sound source while other sound sources are still present.

BRIEF SUMMARY

In view of the foregoing, one or more embodiments of the present invention provide for generating a simultaneous stream of multiple audio selections generated from multiple text passages converted to speech, with different speech attributes applied to each audio selection to audibly distinguish each audio selection from other audio selections, and played in parallel, to provide an audio output creating a space filled with different voices that facilitates a user efficiently audibly scanning through the content of multiple textual content items converted to speech. One or more embodiments of the present invention provide for generating the simultaneous stream of multiple audio selections generated from multiple text passages converted to speech, with different speech attributes applied to each audio selection to audibly position each audio selection in a different position within a multidimensional sound space, to facilitate a user scanning through the content of multiple audio selections presented in parallel in different audible positions, simulating a space filled with different speakers that is available to the user to identify a topic that is of interest to the user from among the audio selections. In addition, in view of the foregoing, one or more embodiments of the present invention provide for monitoring for user posture movement relative to the positions of the audio selections in multidimensional sound space as an indicator of the user's preference to focus in on particular audio selection converted from a textual content source, and selectively adjusting the output characteristics of the particular audio selection to facilitate focused listening to the particular audio selection while also continuing to playback the other audio selections in the multidimensional sound space, to provide an audible environment for output of aggregated textual content converted to speech that ingestible in a similar efficiency as a visual environment for output of the aggregated textual content, with the user able to use posture movement to control focused listening.

In one or more embodiments, a method is directed to identifying, by a computer system, a plurality of content sources each comprising textual content, wherein the plurality of content sources are ordered by interest to a user. The method is directed to converting, by the computer system, each of the plurality of content sources from the textual content to speech comprising a separate audio selection of a plurality of audio selections. The method is directed to applying, by the computer system, to each audio selection, one or more speech attributes to specify the audio attributes that select a respective position of the respective audio selection from among a plurality of positions within a multidimensional sound space and audibly distinguish one or more characteristics of the respective audio selection from other audio selections of the plurality of audio selections, wherein the respective position of the respective audio selection reflects a rank of the respective audio selection as ordered by interest. The method is directed to outputting, by the computer system, a simultaneous stream of the plurality of audio selections to an audio output device for stereo play of the plurality of audio selections within the plurality of positions within the multidimensional sound space to the user with the plurality of positions reflecting the plurality of content sources ordered by interest. One advantage of applying one or more speech attributes to each audio selection to specify the audio attributes that select a respective position of the respective audio selection from among a plurality of positions within a multidimensional sound space and audibly distinguishing one or more characteristics of the respective audio selection from other audio selections of the plurality of audio selections is that the simultaneous stream of the audio selections provides an audio output that supports a user scanning through the content of multiple audio selections presented in parallel in different audible positions detectable by the user and identifying a topic that is of interest to the user from among the audio selections. One advantage of identifying the plurality of content sources ordered by interest to a user and specifying the audio attributes to select a respective position of an audio selection reflecting the rank of the respective audio selection as ordered by interest is that the simultaneous stream of the audio selections provides an audio output that positions content sources that are likely of most interest to the user in one or more primary positions that improves predictability for the user in scanning the audible positions that the audio selections in the one or more primary positions will be of highest interest to the user.

In addition, in one or more embodiments, the step of the method of identifying, by the computer system, the plurality of content sources each comprising textual content, wherein the plurality of content sources are ordered by interest to the user may be directed to monitoring, by the computer system, content accessed by a user for an indication of selection of the content by the user. The method may be further directed to responsive to detecting the indication of selection of the content by the user, recording, by the computer system, the indication of the selection and the content in a content history log. The method may be further directed to analyzing, by the computer system, the content history log for a frequency of at least one type of content. The method may be further directed to generating, by the computer system, at least one topic preference for the user based on the at least one type of content and the respective frequency. The method may be further directed to training, by the computer system, a cognitive model with the at least one topic preference and the respective frequency to identify other content comprising the at least one topic. The method may be further directed to responsive to the user accessing a website comprising a plurality of text passages, identifying, by the computer system, through the cognitive model the plurality of content sources from a selection of the plurality of text passages that comprise the at least one topic. The method may be further directed to ordering, by the computer system, the plurality of content sources according to a respective priority level identified by the cognitive model based on the respective frequency of the at least one topic present in the respective content source of the plurality of content sources. One advantage of training a cognitive model with topic preferences and frequencies based on monitored used activity accessing and responding to content, and then selectively identifying and ordering content sources by the trained cognitive model is that the selection of content sources played in parallel in a simultaneous stream are ordered in audible position according to likelihood of interest for a particular user, to improve the efficiency of the particular user scanning through multiple audio selections streamed in parallel and finding at least one audible selection of interest to the user.

In addition, in one or more embodiments, the step of the method of identifying, by the computer system, the plurality of content sources each comprising textual content, wherein the plurality of content sources are ordered by interest to the user may be directed to identifying, by the computer system, an interface comprising a plurality of text passages available from a content aggregator. The method may be further directed to dividing, by the computer system, the plurality of text passages from the content aggregator into separate content sources of the plurality of content sources based on output interface settings specifying at least one graphical characteristic for identifying boundaries between text passages in the interface. One advantage of identifying text passages available from a content aggregator and then dividing the text passages into content sources based on output interface settings specifying at least one graphical characteristic for identifying boundaries between text passages in the interface is that content sources are identified independent of any particular content aggregator interface such that the simultaneous stream is generated for content sources from multiple types of content aggregators and independent of whether the content aggregator outputs the text passages in an interface for conversion to speech.

In addition, in one or more embodiments, the step of the method of applying, by the computer system, to each audio selection, the one or more speech attributes to specify the audio attributes that select the respective position of the respective audio selection from among the plurality of positions within the multidimensional sound space and audibly distinguish the one or more characteristics of the respective audio selection from other audio selections of the plurality of audio selections, wherein the respective position of the respective audio selection reflects the rank of the respective audio selection as ordered by interest may be directed to applying, by the computer system, to each audio selection, the one or more speech attributes to specify the audio attributes for a particular position of the plurality of positions in a primary position in front of the user within the multidimensional sound space for a particular audio selection converted from a particular content source with a highest rank as ordered by interest. One advantage of applying the one or more speech attributes to specify the audio attributes for a particular audio selection with a highest rank as ordered by interest in a primary position in front of the user within the multidimensional sound space is that the user is provided with an audio output with multiple audio selections in different positions, with the audio selection most likely of interest to the user positioned predictably in a position in front of the user to improve the efficiency with which a user determines an order to scan and focus in on each of the audio selections played in parallel.

In addition, in one or more embodiments, the method may be directed to monitoring, by the computer system, for input indicating a user posture change. The method may also be directed to, responsive to detecting the input indicating the user posture change, analyzing, by the computer system, a direction of movement of the user posture change relative to a positioning of the plurality of audio selections in the multidimensional sound space comprising a 3D sound space. The method may also be directed to identifying, by the computer system, a particular audio selection from among the plurality of audio selections selected by the user based on the direction of movement of the user posture change relative to the positioning of the plurality of audio selections in the 3D sound space. The method may also be directed to applying, by the computer system, to each audio selection, one or more updated speech attributes to specify the audio attributes that select the respective position of the respective audio selection from among the plurality of positions within the 3D sound space and audibly distinguish the one or more characteristics of the respective audio selection from other audio selections of the plurality of audio selections, wherein the particular audio selection is moved to a primary position in front of the user within the 3D sound space and a volume of the particular audio selection is increased relative to the other audio selections of the plurality of audio selections. One advantage of monitoring for input indicating a user posture change and detecting the direction of movement in the user posture change relative to the positioning of audio selection in the multidimensional sound space is that a user provides an input to focusing in on a particular audio selection by a minimal motion that allows the user to select to focus on a particular audio selection from among multiple audio selections in a simultaneous stream in a hands-free manner and without requiring an precise movement.

In one or more embodiments, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instruction to identify a plurality of content sources each comprising textual content, wherein the plurality of content sources are ordered by interest to a user. The stored program instructions comprise program instruction to, convert each of the plurality of content sources from the textual content to speech comprising a separate audio selection of a plurality of audio selections. The stored program instructions comprise program instruction to, apply, to each audio selection, one or more speech attributes to specify the audio attributes that select a respective position of the respective audio selection from among a plurality of positions within a multidimensional sound space and audibly distinguish one or more characteristics of the respective audio selection from other audio selections of the plurality of audio selections, wherein the respective position of the respective audio selection reflects a rank of the respective audio selection as ordered by interest. The stored program instructions comprise program instruction to output a simultaneous stream of the plurality of audio selections to an audio output device for stereo play of the plurality of audio selections within the plurality of positions within the multidimensional sound space to the user with the plurality of positions reflecting the plurality of content sources ordered by interest. One advantage of applying one or more speech attributes to each audio selection to specify the audio attributes that select a respective position of the respective audio selection from among a plurality of positions within a multidimensional sound space and audibly distinguishing one or more characteristics of the respective audio selection from other audio selections of the plurality of audio selections is that the simultaneous stream of the audio selections provides an audio output that supports a user scanning through the content of multiple audio selections presented in parallel in different audible positions detectable by the user and identifying a topic that is of interest to the user from among the audio selections. One advantage of identifying the plurality of content sources ordered by interest to a user and specifying the audio attributes to select a respective position of an audio selection reflecting the rank of the respective audio selection as ordered by interest is that the simultaneous stream of the audio selections provides an audio output that positions content sources that are likely of most interest to the user in one or more primary positions that improves predictability for the user in scanning the audible positions that the audio selections in the one or more primary positions will be of highest interest to the user.

In addition, in one or more embodiments, the stored program instructions to identify the plurality of content sources each comprising textual content, wherein the plurality of content sources are ordered by interest to the user may be directed to stored program instructions to monitor content accessed by a user for an indication of selection of the content by the user. The computer system may further comprise stored program instructions to, responsive to detecting the indication of selection of the content by the user, record the indication of the selection and the content in a content history log. The computer system may further comprise stored program instructions to analyze the content history log for a frequency of at least one type of content. The computer system may further comprise stored program instructions to generate at least one topic preference for the user based on the at least one type of content and the respective frequency. The computer system may further comprise stored program instructions to train a cognitive model with the at least one topic preference and the respective frequency to identify other content comprising the at least one topic. The computer system may further comprise stored program instructions to, responsive to the user accessing a website comprising a plurality of text passages, identify, through the cognitive model the plurality of content sources from a selection of the plurality of text passages that comprise the at least one topic. The computer system may further comprise stored program instructions to order the plurality of content sources according to a respective priority level identified by the cognitive model based on the respective frequency of the at least one topic present in the respective content source of the plurality of content sources. One advantage of training a cognitive model with topic preferences and frequencies based on monitored used activity accessing and responding to content, and then selectively identifying and ordering content sources by the trained cognitive model is that the selection of content sources played in parallel in a simultaneous stream are ordered in audible position according to likelihood of interest for a particular user, to improve the efficiency of the particular user scanning through multiple audio selections streamed in parallel and finding at least one audible selection of interest to the user.

In addition, in one or more embodiments, the stored program instructions to identify the plurality of content sources each comprising textual content, wherein the plurality of content sources are ordered by interest to the user may be directed to stored program instructions to identify an interface comprising a plurality of text passages available from a content aggregator. The computer system may further comprise stored program instructions to divide the plurality of text passages from the content aggregator into separate content sources of the plurality of content sources based on output interface settings specifying at least one graphical characteristic for identifying boundaries between text passages in the interface. One advantage of identifying text passages available from a content aggregator and then dividing the text passages into content sources based on output interface settings specifying at least one graphical characteristic for identifying boundaries between text passages in the interface is that content sources are identified independent of any particular content aggregator interface such that the simultaneous stream is generated for content sources from multiple types of content aggregators and independent of whether the content aggregator outputs the text passages in an interface for conversion to speech.

In addition, in one or more embodiments, the stored program instructions to apply, to each audio selection, the one or more speech attributes to specify the audio attributes that select the respective position of the respective audio selection from among the plurality of positions within the multidimensional sound space and audibly distinguish the one or more characteristics of the respective audio selection from other audio selections of the plurality of audio selections, wherein the respective position of the respective audio selection reflects the rank of the respective audio selection as ordered by interest may be directed to stored program instructions to apply, to each audio selection, the one or more speech attributes to specify the audio attributes for a particular position of the plurality of positions in a primary position in front of the user within the multidimensional sound space for a particular audio selection converted from a particular content source with a highest rank as ordered by interest. One advantage of applying the one or more speech attributes to specify the audio attributes for a particular audio selection with a highest rank as ordered by interest in a primary position in front of the user within the multidimensional sound space is that the user is provided with an audio output with multiple audio selections in different positions, with the audio selection most likely of interest to the user positioned predictably in a position in front of the user to improve the efficiency with which a user determines an order to scan and focus in on each of the audio selections played in parallel.

In addition, in one or more embodiments, the computer system may comprise stored program instructions to monitor for input indicating a user posture change. The method may also be directed to, responsive to detecting the input indicating the user posture change, analyzing, by the computer system, a direction of movement of the user posture change relative to a positioning of the plurality of audio selections in the multidimensional sound space comprising a 3D sound space. The computer system may further comprise stored program instructions to identify a particular audio selection from among the plurality of audio selections selected by the user based on the direction of movement of the user posture change relative to the positioning of the plurality of audio selections in the 3D sound space. The computer system may further comprise stored program instructions to apply, to each audio selection, one or more updated speech attributes to specify the audio attributes that select the respective position of the respective audio selection from among the plurality of positions within the 3D sound space and audibly distinguish the one or more characteristics of the respective audio selection from other audio selections of the plurality of audio selections, wherein the particular audio selection is moved to a primary position in front of the user within the 3D sound space and a volume of the particular audio selection is increased relative to the other audio selections of the plurality of audio selections. One advantage of monitoring for input indicating a user posture change and detecting the direction of movement in the user posture change relative to the positioning of audio selection in the multidimensional sound space is that a user provides an input to focusing in on a particular audio selection by a minimal motion that allows the user to select to focus on a particular audio selection from among multiple audio selections in a simultaneous stream in a hands-free manner and without requiring an precise movement.

In one or more embodiments, a computer program product comprises a computer readable storage medium having program instructions embodied therewith. The computer readable storage medium is not a transitory signal per se. The program instructions are executable by a computer to cause the computer to identify, by a computer, a plurality of content sources each comprising textual content, wherein the plurality of content sources are ordered by interest to a user. The program instructions are executable by a computer to cause the computer to, convert, by the computer, each of the plurality of content sources from the textual content to speech comprising a separate audio selection of a plurality of audio selections. The program instructions are executable by a computer to cause the computer to, apply, by the computer, to each audio selection, one or more speech attributes to specify the audio attributes that select a respective position of the respective audio selection from among a plurality of positions within a multidimensional sound space and audibly distinguish one or more characteristics of the respective audio selection from other audio selections of the plurality of audio selections, wherein the respective position of the respective audio selection reflects a rank of the respective audio selection as ordered by interest. The program instructions are executable by a computer to cause the computer to output, by the computer, a simultaneous stream of the plurality of audio selections to an audio output device for stereo play of the plurality of audio selections within the plurality of positions within the multidimensional sound space to the user with the plurality of positions reflecting the plurality of content sources ordered by interest. One advantage of applying one or more speech attributes to each audio selection to specify the audio attributes that select a respective position of the respective audio selection from among a plurality of positions within a multidimensional sound space and audibly distinguishing one or more characteristics of the respective audio selection from other audio selections of the plurality of audio selections is that the simultaneous stream of the audio selections provides an audio output that supports a user scanning through the content of multiple audio selections presented in parallel in different audible positions detectable by the user and identifying a topic that is of interest to the user from among the audio selections. One advantage of identifying the plurality of content sources ordered by interest to a user and specifying the audio attributes to select a respective position of an audio selection reflecting the rank of the respective audio selection as ordered by interest is that the simultaneous stream of the audio selections provides an audio output that positions content sources that are likely of most interest to the user in one or more primary positions that improves predictability for the user in scanning the audible positions that the audio selections in the one or more primary positions will be of highest interest to the user.

In addition, in one or more embodiments, the computer program product may comprise the program instructions executable by a computer to identify, by the computer, the plurality of content sources each comprising textual content, wherein the plurality of content sources are ordered by interest to the user may be directed to stored program instructions to monitor content accessed by a user for an indication of selection of the content by the user. The computer program product may comprise the program instructions executable by a computer to, responsive to detecting the indication of selection of the content by the user, record, by the computer, the indication of the selection and the content in a content history log. The computer program product may comprise the program instructions executable by a computer to analyze, by the computer, the content history log for a frequency of at least one type of content. The computer program product may comprise the program instructions executable by a computer to generate, by the computer, at least one topic preference for the user based on the at least one type of content and the respective frequency. The computer program product may comprise the program instructions executable by a computer to train, by the computer, a cognitive model with the at least one topic preference and the respective frequency to identify other content comprising the at least one topic. The computer program product may comprise the program instructions executable by a computer to, responsive to the user accessing a website comprising a plurality of text passages, identify, by the computer, through the cognitive model the plurality of content sources from a selection of the plurality of text passages that comprise the at least one topic. The computer program product may comprise the program instructions executable by a computer to order, by the computer, the plurality of content sources according to a respective priority level identified by the cognitive model based on the respective frequency of the at least one topic present in the respective content source of the plurality of content sources. One advantage of training a cognitive model with topic preferences and frequencies based on monitored used activity accessing and responding to content, and then selectively identifying and ordering content sources by the trained cognitive model is that the selection of content sources played in parallel in a simultaneous stream are ordered in audible position according to likelihood of interest for a particular user, to improve the efficiency of the particular user scanning through multiple audio selections streamed in parallel and finding at least one audible selection of interest to the user.

In addition, in one or more embodiments, the computer program product may comprise the program instructions executable by a computer to identify, by the computer, the plurality of content sources each comprising textual content, wherein the plurality of content sources are ordered by interest to the user may be directed to stored program instructions to identify an interface comprising a plurality of text passages available from a content aggregator. In addition, in one or more embodiments, the computer program product may comprise the program instructions executable by a computer to divide, by the computer, the plurality of text passages from the content aggregator into separate content sources of the plurality of content sources based on output interface settings specifying at least one graphical characteristic for identifying boundaries between text passages in the interface. One advantage of identifying text passages available from a content aggregator and then dividing the text passages into content sources based on output interface settings specifying at least one graphical characteristic for identifying boundaries between text passages in the interface is that content sources are identified independent of any particular content aggregator interface such that the simultaneous stream is generated for content sources from multiple types of content aggregators and independent of whether the content aggregator outputs the text passages in an interface for conversion to speech.

In addition, in one or more embodiments, the computer program product may comprise the program instructions executable by a computer to apply, by the computer, to each audio selection, the one or more speech attributes to specify the audio attributes for a particular position of the plurality of positions in a primary position in front of the user within the multidimensional sound space for a particular audio selection converted from a particular content source with a highest rank as ordered by interest. One advantage of applying the one or more speech attributes to specify the audio attributes for a particular audio selection with a highest rank as ordered by interest in a primary position in front of the user within the multidimensional sound space is that the user is provided with an audio output with multiple audio selections in different positions, with the audio selection most likely of interest to the user positioned predictably in a position in front of the user to improve the efficiency with which a user determines an order to scan and focus in on each of the audio selections played in parallel.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
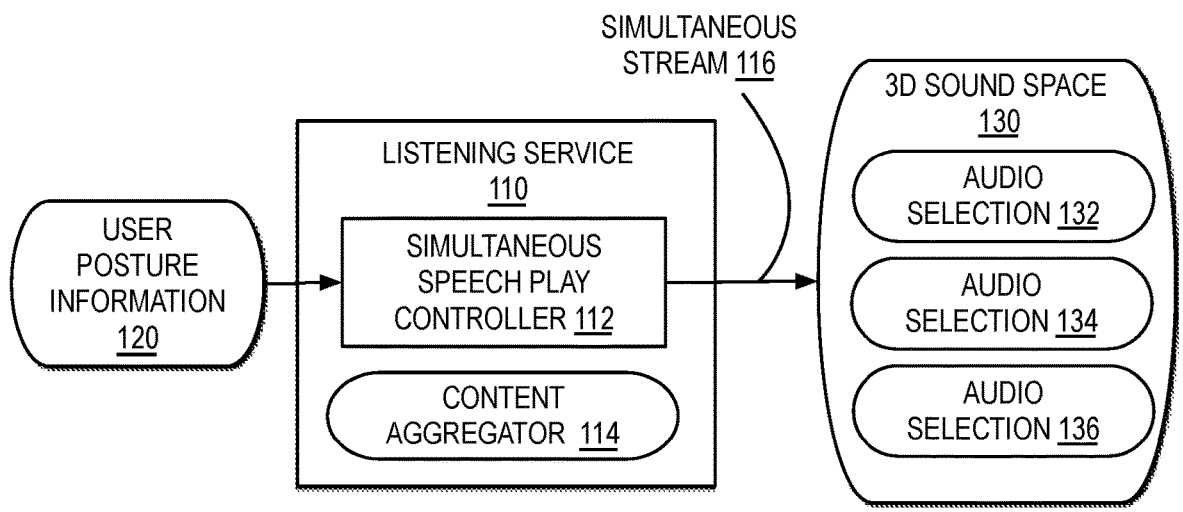
FIG. 1 illustrates a block diagram of one example of a listening service implementing a simultaneous speech play controller that is guided by user posture information to position an audio selection, converted from text to speech play of a particular content source from among multiple content sources provided by a content aggregator, in a primary position, from among multiple content sources converted from text to speech and played in parallel.

FIG. 1 illustrates a block diagram of one example of a listening service implementing a simultaneous speech play controller that is guided by user posture information to position an audio selection, converted from text to speech play of a particular content source from among multiple content sources provided by a content aggregator, in a primary position, from among multiple content sources converted from text to speech and played in parallel.

In one example, a listening service 110 provides a service for controlling an audio output stream of one or more content sources available from a content aggregator 114. In one example, content aggregator 114 includes textual content that may represent multiple content sources, such as multiple articles published on a news website or in a news feed, multiple social media entries published on a social media website, multiple search results aggregated in a search result website, multiple entries in an electronic email, multiple entries in a text chain, and other aggregations of content that may be identified as independent content items accessible to a user from an application, website, or other service. In one example, content aggregator 114 includes textual content. In another example, content aggregator 114 includes graphical and audio content in addition to the textual content.

In one example, the embodiment in FIG. 1 provides the advantage of listening service 110 which is useful for controlling an audio output stream of one or more content sources available from content aggregator 114 independent of whether content aggregator 114 intends for the output content to be output in an audio output stream format. Advantageously, listening service 110 includes a simultaneous speech play controller 112 for evaluating a webpage or other interface provided by content aggregator 114, evaluating the presence of one or more types of delineations between separate textual content items within the webpage or other interface, and identifying content sources from the delineated textual content items.

In one example, the embodiment in FIG. 1 provides the advantage of simultaneous speech play controller 112 also managing output of a simultaneous stream 116 of multiple audio selections generated from the multiple content sources available from content aggregator 114, to facilitate a user efficiently reviewing the content of multiple content sources, in parallel. Advantageously, simultaneous speech play controller 112 outputs simultaneous stream 116 that simultaneously includes audio tracks for each of an audio selection 132, an audio selection 134, and an audio selection 136, each converted to audible speech from a different content source available from content aggregator 114. In additional or alternate embodiments, simultaneous stream 116 includes additional or alternate audio selections.

In the example, simultaneous speech play controller 112 converts text-based content sources, from content aggregator 114, to speech to be output as audible selections prior to output in simultaneous stream 116. Simultaneous speech play controller 112 may implement one or more types of text to speech converters, with one or more selectable conversion settings, for converting text-based items to speech.

In addition, the embodiment in FIG. 1 provides the advantage of simultaneous speech play controller 112 managing an output of simultaneous stream 116 as stereo sound with three dimensional (3D) positional audio adjustments to each of the multiple audio selections to create the effect of each audio selection being positioned in a different area of a 3D sound space 130, to facilitate a user effectively audibly distinguishing between the content of multiple content sources, in parallel. In the example, 3D sound space 130 represents an audible output of perceived locations of sounds detectable by a user listening to simultaneous stream 116 as output by a stereo output device, such as stereo headphones worn by the user or stereo speakers broadcasting in an area in which the user is present. In one example, stereo output devices represent audio output devices that simultaneously playback distinct sounds out of different individual speaker units to support a surround sound effect of audio perceptible as positioned in different places within the 3D sound space around a user. In another embodiment, simultaneous stream 116 is output by audio output devices that support other dimensions of audio output, including, but not limited to, a one dimensional space or two dimensional space.

For example, simultaneous speech play controller 112 may manage output of simultaneous stream 116 with the 3D positional audio adjustments to audio selection 132 to be perceived to the left of a user, the 3D positional audio adjustments to audio selection 134 to be perceived to the center of a user, and the 3D positional audio adjustments to audio selection 136 to be perceived to the right of a user. In additional or alternate examples, the 3D positional audio adjustments may place audio selections within 3D sound space 130 in positions above the user, below the user, or within other perceivable positions within a 3D area perceivable by the user.

In one example, the embodiment in FIG. 1 provides the advantage of simultaneous speech play controller 112 managing additional speech attribute tuning to differentiate the characteristics of content sources simultaneously output as audio selection 132, audio selection 134, and audio selection 136. For example, simultaneous speech play controller 112 adjusts speech attributes that distinguish characteristics such as speed, dub, tone, and volume to differentiate the content sources converted into output as audio selection 132, audio selection 134, and audio selection 136.

Advantageously, simultaneous speech play controller 112 generates simultaneously streamed audio selections with multiple voices in a 3D sound space 130 that is effectively and efficiently navigable by a user as the user focus's one's auditory attention and the effect of selective hearing in the brain, which may also be referred to as the cocktail party effect, when presented with audio that includes multiple voices speaking with different characteristics and from different positions. In one example, based on a user's ability to focus one's auditory attention and engage selective hearing, a person may tune into a single speaker or stimulus, while tuning out a crowd of speakers or filtering out a range of other stimuli, such as when a user can focus on a single conversation in a noisy room. Based on the ability of a person to engage selective hearing, a person has the ability to segregate different speakers into different streams and decide which stream is most pertinent to the user, allowing a person to tune in to one voice or tune out of others. A person's brain may have the ability to segregate different auditory stimuli into different streams and also determine which stream is most pertinent. An advantage of simultaneous speech play controller 112 adjusting the positions and characteristics of different audio selections within 3D sound space 130 is that the output of simultaneous stream 116 simulates a crowd of speakers with different voice types, volumes, rates of speech, and speaking from different positions, to support a user listening to all the voices in parallel and then focusing, through selective hearing, to a particular voice for enhanced cognitive focus, while also filtering out the other voices.

In addition to outputting simultaneous stream 116 with the characteristics and positions of each audio selection adjusted to facilitate a user engaging selective hearing to tune into to a particular audio selection within simultaneous stream 116, advantageously, simultaneous speech play controller 112 dynamically adjusts the characteristics and positions of each audio selection in response to user postures in relation to the audio selections in 3D sound space 130. For example, simultaneous speech play controller 112 receives an input of user posture information 120, analyzes the positioning of audio selections in 3D sound space 130 in relation to user posture information 120, determines a particular audio selection the user posture is directed towards, and adjusts the characteristics and positions of each audio selection in simultaneous stream 116 to control the particular audio selection as the primary source in a primary position. In one example, user posture information 120 represents a head movement detected by a gyroscope or other type of motion detector in a stereo headphone set worn by a user. Advantageously, simultaneous speech play controller 112 receives user posture information 120 indicating a direction of movement for indicating a user selection of an audio selection, but not require any particular exact movement, to direct selection of a particular audio selection for positioning in a primary position within 3D sound space 130.

In one embodiment, listening service 110 evaluates a direction of movement of a user's head identified in user posture information 120 towards a particular audio selection within 3D sound space 130 as input that triggers simultaneous speech play controller 112 to select which audio selection is positioned in the primary position in 3D sound space 130. In another embodiment, listening service 110 may evaluate other gestures or posture changes by a user, indicated in user posture information 120, as input for directing listening service 110 to switch to a different content aggregator, where listening service 110 may manage play of simultaneous streams from multiple content aggregators.

An advantage of listening service 110 supporting speech to text conversion of multiple content sources identified from content aggregator 114 is that a user receives audio of multiple voices of speech converted from multiple text passages, in parallel, which provides efficient audio based browsing of multiple content sources provided by content aggregator 114. An advantage of listening service 110 managing adjustment of a particular audio selection to play in a primary position and at higher volume within 3D sound space 130 in response to user posture information 120 is that a user's selective hearing process is supported in response to minimal effort required by the user of the user turning one's head in the direction of content in which the user is interested, allowing a user to control selective listening in a hands-free environment.

Figure 2:
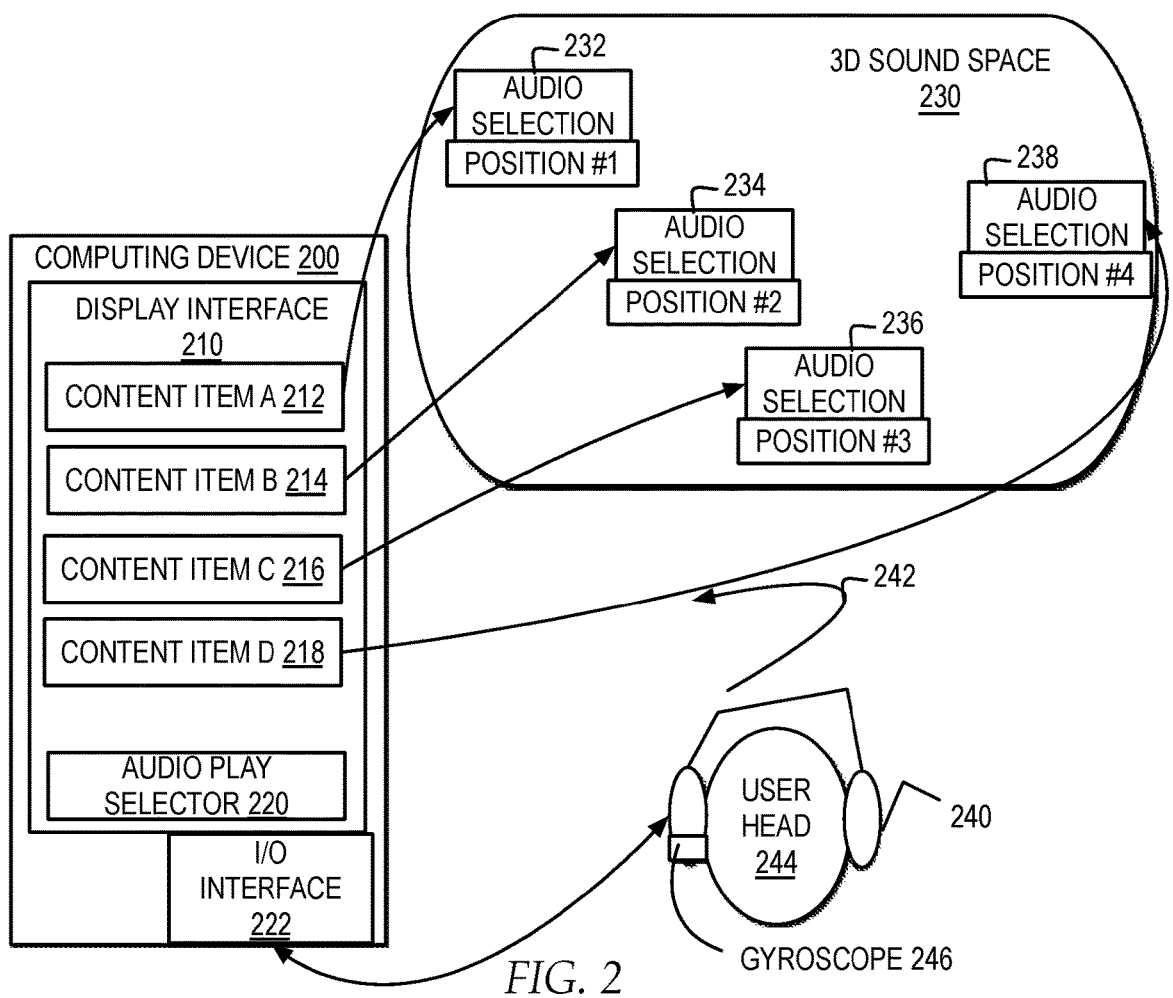
FIG. 2 illustrates a block diagram of one example of a computing device implementing a simultaneous speech play controller that is guided by user posture information from a gyroscope to tune into an audio selection positioned in a primary position from among multiple content sources converted from text to speech and played in parallel.

FIG. 2 illustrates a block diagram of one example of a computing device implementing a simultaneous speech play controller that is guided by user posture information from a gyroscope to tune into an audio selection positioned in a primary position from among multiple content sources converted from text to speech and played in parallel.

In one example, a computing device 200 includes a display interface 210 in which content sources from content aggregator 114 are displayed as selectable content items, such as content item A 212, content item B 214, content item C 216, and content item D 218. In one embodiment, each of content item A 212, content item B 214, content item C 216, and content item D 218 represent independent content items each identifiable by simultaneous speech play controller 112 as content sources. In one example, each of content item A 212, content item B 214, content item C 216, and content item D 218 are displayed as textual content aggregated in display interface 210 that are individually selectable by a user to visually read the textual content in full. Alternatively, each of content item A 212, content item B 214, content item C 216, and content item D 218 may also be individually selectable by a user to listen to as speech that is converted from the textual content. In another embodiment, one or more of content item A 212, content item B 214, content item C 216, and content item D 218 represents an audio-based content item that is selectable within display interface 210 and that does not require an initial conversion from text into speech for output in an audible format.

In one embodiment, a user may select to read or play each of the selectable content items in display interface 210 by selecting the item within display interface 210. In addition, according to an advantage of one embodiment, the user may select to simultaneously play each of the identifiable content items in display interface 210 by selecting an audio play selector 220 in display interface 210 to trigger simultaneous speech play controller 112 of listening service 110 or by providing another type of input to trigger simultaneous speech play controller 112 of listening service 110. An advantage of a user selecting to simultaneously play each identifiable content item in display interface 210 by selecting to trigger simultaneous speech play controller 112 is that the user is able to select to audibly review each of the content items in parallel in a manner similar in efficiency to the user visibly scanning each of the content items within display interface 210, to select to further tune into a particular content item.

In one example, computing device 200 controls output of an audio stream via an input/output (I/O) interface 222 to a stereo audio output device accessible to a user that supports output of a 3D audio stream. In one embodiment illustrated in FIG. 2, computing device 200 controls output of the audio stream through I/O interface 222 to stereo headphones 240 worn on a user head 244 of a user. In one example, I/O interface 222 may output the audio stream through a wired connection between I/O interface 222 and stereo headphones 240 or through a wireless connection between I/O interface 222 and stereo headphones 240.

In one example, simultaneous speech play controller 112 initially outputs a simultaneous stream into 3D sound space 230 with content item A 212 output as an audio selection 232 in "position #1", with content item B 214 output as an audio selection 234 in "position #2", with content item C 216 output as an audio selection 236 in "position #3", and with content item D 218 output as an audio selection 238 in "position #4". In the example, "position #3" is considered the primary position in front of a user, with "position #1" and "position #2" to the left of the center position and "position #4" to the right of the center position. Advantageously, simultaneous speech play controller 112 selects the positions of each content source when converted into output as an audio selection based on a ranked order of interest to a user, to position audio selections that are most likely of interest to the user in a primary position in front of the user, to support the user in applying selective hearing to efficiently listen to all audio selections in parallel, with the audio selections likely of most interest positioned in the audible positions in front of the user. In one example, the ordering of content items within display interface 210 is different from the ordered ranking by interest to a user determined by simultaneous speech play controller 112 and applied to the position selections of the content items, where content item C 216 is determined as the content source of a highest ranking and initially positioned in position #3, in the primary position. Alternatively, the ordering of content items within display interface 210 may reflect the ordered ranking by interest to a user.

In the example, I/O interface 222 supports an interface for detecting outputs from stereo headphones 240 or other output devices that detect a user's posture changes and broadcast or send the user's posture changes as user posture information 120. In one embodiment, stereo headphones 240 incorporates a gyroscope 246 that detects changes in movement of user head 244 by measuring rotational motion and reports the changes in movement as user posture information 120. In other embodiments, other sensors worn by or not worn by a user may monitor for changes in movement of user head 244 or other gestures by a user and report the changes in movement as user posture information 120. In one embodiment, stereo headphones 240 incorporate gyroscope 246 for detecting changes in orientation of user head in order to dynamically adjust the actual positions selected for positioning audio within 3D sound space 230 relative to the user's head position, and simultaneous speech play controller 112 also receives the detected changes in movement as user posture information 120.

In one example, gyroscope 246 detects the rotational motion of user head 244 turning to the left, as illustrated by the rotational motion direction at reference numeral 242. In one example, gyroscope 246 includes one or more sensors that each measure angular velocity, for example, in units of degrees per second or revolutions per second, by monitoring the rotation around one or more axes, including, but not limited to a triple axes. In one example, each sensor in gyroscope 246 has a resonating mass that shifts as angular velocity changes and the resonating mass movement is converted into electrical signals that indicate the change in degrees per second or revolutions per second.

In the example, in response to I/O interface 222 detecting the output from gyroscope 246 as user posture information 120, simultaneous speech play controller 112 evaluates user posture information 120 relative to the positions of audio selections in 3D sound space 230 to determine how to adjust the positions of audio selections in 3D sounds space 230 based on user input. In one example, audio selection 236 in "position #3" is perceived by the user in a primary, center position within 3D sound space 230 and simultaneous speech play controller 112 analyzes the user head movement to the left as indicating the user selection of audio selection 234. In response to analyzing the user selection of audio selection 234, simultaneous speech play controller 112 adjusts the audio attributes of each audio selection to effectively reposition audio selection 234 in the center position within 3D sound space and moves audio selection 236 to an alternative position within 3D sound space 230. Advantageously, simultaneous speech play controller 112 adjusts the positions of each content source when converted into output as an audio selection based on user posture information 120 indicating a preference for a particular audio selection, to position a user selected audio selection in a primary position in front of the user to support the user in applying selective hearing to efficiently listen to the particular audio selection while all other audio selections continue to play in the background, such that the user may still turn attention to tuning into the other audio selections.

Figure 3:
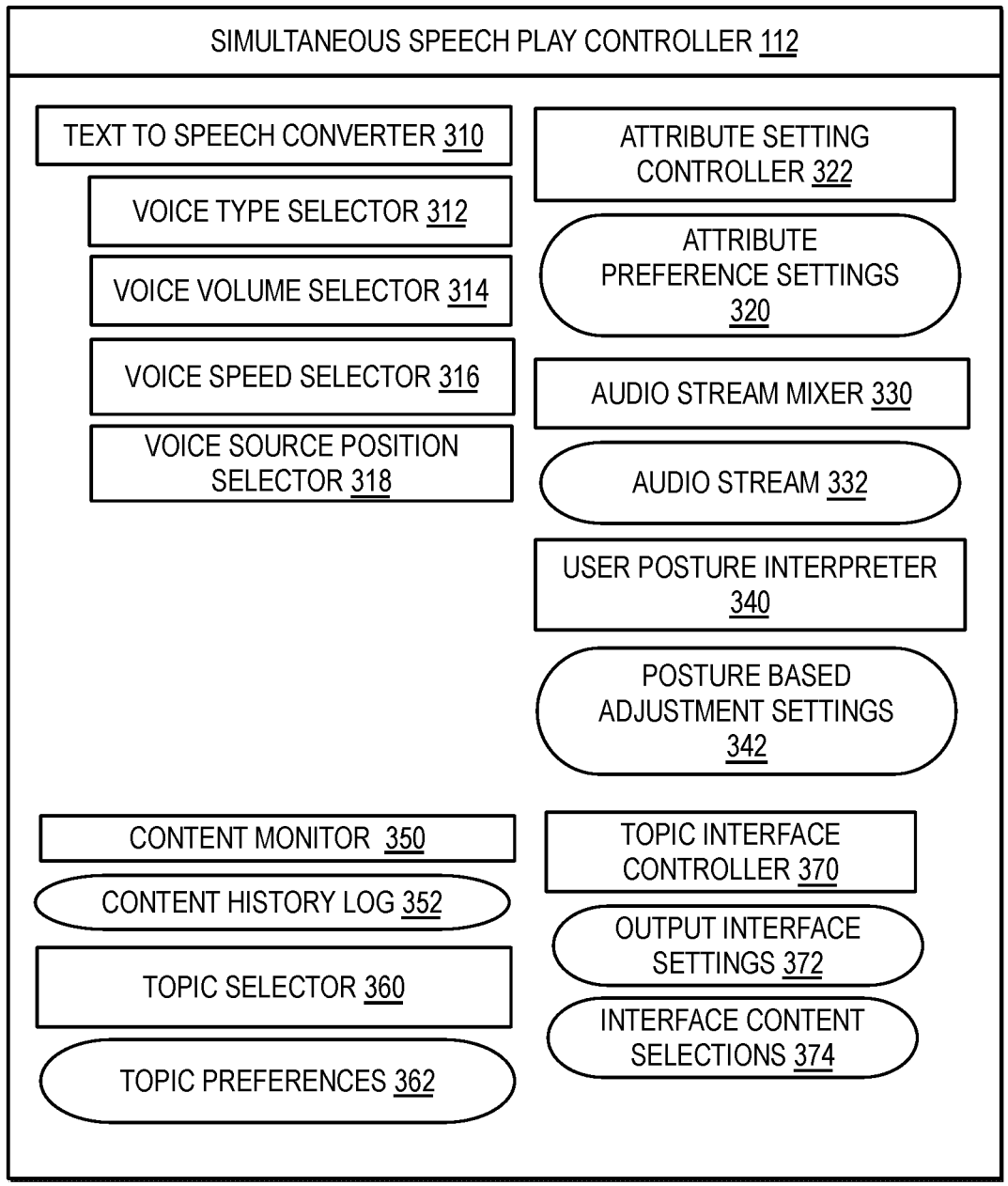
FIG. 3 illustrates a block diagram of one example of components of a simultaneous speech play controller.

FIG. 3 illustrates a block diagram of one example of components of a simultaneous speech play controller.

In the example, simultaneous speech play controller 112 includes a content monitor 350. Content monitor 350 monitors the content accessed by a user from one or more online sources and stores records of the content accesses in a content history log 352. In monitoring content accessed by a user, content monitor 350 may also analyze which content accesses a user indicates a preference for through one or more types of inputs, such as a user selection to listen to a particular audio selection from among multiple audio selections in simultaneous stream 116, and update or filter content history log 352 with indications of user preferences through user indications of content selection.

In the example, simultaneous speech play controller 112 includes a topic selector 360. Topic selector 360 analyzes content history log 352 to determine types of topics of interest to a user and the frequency of each type. Topic selector 360 generates topic preferences 362 including the topics of interest and frequencies, which provide indicators of a priority of a topic of interest. In one example, topic selector 360 may apply a cognitive analysis function that receives a large amount of content from content history log 352 to train and periodically update a cognitive model that learns a user's topic preferences 362 and is able to then analyze new content and quickly determine whether new content selections match topic preferences 362 for a user.

In one embodiment, when a user selects to access listening service 110 through one or more interfaces, a topic interface controller 370 may initially request or access, and also filter, available textual content from content aggregator 114 for output by a topic interface controller 370. For example, topic interface controller 370 may request current content from content aggregator 114 based on topic preferences 362 for determination of interface content selections 374 for output in simultaneous stream 116. Topic interface controller 370 may further filter the content received from content aggregator 114 through a cognitive model of topic selector 360 to select only a selection of content sources received from content aggregator 114 as interface content selections 374 and to order content sources according to probability of interest to the user based frequency and other priority information available in topic preferences 362.

In another embodiment, output interface settings 372 directs topic interface controller 370 to divide a home page of content aggregator 114 into content sources, based on one or more graphical characteristics identifying boundaries of text passages, such as by dividing a news website into multiple content sources based the layout of the news website with a headline graphical element or header code indicating the start of a boundary of a text passage. Topic interface controller 370 then analyzes each of the content sources by applying topic preferences 362 to sort and order each of the content sources according to a particular user's interest in the topics present in each content source.

In the example, simultaneous speech play controller 112 includes a text to speech converter 310 for converting text to speech. In the example, topic interface controller 370 selects multiple content sources in interface content selections 374 and text to speech converter 310 converts each textual content source to speech, each specified by one or more selectable features for adjusting the audio attributes of the speech conversion, to differentiate the different content sources for simultaneous streaming to simulate an environment in which a user hears multiple different speakers in parallel and supports the user selectively tuning into one of the speakers while the other speakers continue to play in the background. In one embodiment, the multiple selectable features for adjusting the audio attributes of the speech conversion include voice position and one or more characteristics such as, but not limited to, voice type, voice volume, and voice speed.

In the example, a voice type selector 312 selects a voice type for application by text to speech converter 310 to specify the characteristics of the speech conversion of a content source from interface content selections 374. Voice types may include one or more dub voice types in one or more languages.

In the example, voice volume selector 314 selects a voice volume for application by text to speech converter 310 to specify the characteristics of the speech conversion of a content source from interface content selections 374. Voice volume may include one or more types of volume characteristics, including, but not limited to pitch, duration, timbre, and loudness.

In the example, voice speed selector 316 selects a speed of speech for application by text to speech converter 310 to specify the characteristics of the speech conversion of a content source from interface content selections 374. Voice speed may include one or more increments of slowing down or speeding up the rate of words per minute in the speech converted from text.

In the example, voice source position selector 318 selects a spatial location for application by text to speech converter 310 to specify the speech conversion of a content source from interface content selections 374. Spatial location may represent the cognitive placement of a sound within 3D source space 130, including the placement of a source within multiple planes at a particular perceived distance from the user.

In one example, an audio stream mixer 330 initially applies attribute preference settings 320 to mix the voice attributes of content source from interface content selections 374 and output an audio stream 332 simultaneously playing the speech from each of the converted content selections, such as simultaneous stream 116. In the example, attribute preference settings 320 specify one or more preferences for specifying voice type selector 320, voice volume selector 314, voice speed selector 316, and voice source position selector 318.

In the example, attribute preference settings 320 may specify preferences based on topic subject matter, topic theme, topic priority, and other features that facilitate a user differentiating between speech from converted from different content sources when simultaneously streamed. For example, a user may specify attribute preference settings 320 with different voice types by topic, different voice volumes by weight of interest in topics and by position or font size of the content on a content aggregator website, different speech speeds by theme of topics, and different voice source positions by weight of interest with content of most interest positioned in a primary position.

In the example, user posture interpreter 340 detects user posture information 120, indicating user movement, and determines a selection made by the user based on the user movement relative to the positions of the voice source position settings of the audio selections output in audio stream 332. Audio stream mixer 330 applies posture based adjustment settings 342 to adjust one or more attributes applied by voice type selector 312, voice volume selector 314, voice speed selector 316, and voice source position selector 318, and to reflect the choice of audio selection by the user based on the user movement relative to the positions of the voice source position settings of the audio selections output in audio stream 332. In one example, posture based adjustment settings 342 specify that in response to a user making a motion to the right or left of center towards an audio selection, audio stream mixer 330 shifts the positions applied by voice source position selector 316 to each of the content conversions to speech, to reposition the audio selection motioned towards by the user into the center position within 3D sound space 230. In addition, posture based adjustment settings 342 may include settings for adjusting the voice type, voice volume, and voice speeds of the audio selections in audio mixed in audio stream 332 to feature the selected audio selection in a manner that supports the user's ability to further selectively focus on the audio selection positioned in the center position of 3D source space 230.

Further, posture based adjustment settings 342 may include settings for adjusting the voice type, voice volume and voice speeds of the audio selections in audio mixed in audio stream 332 to increase the focus on the center positioned audio selection over time, such as by increasing the volume of the center positioned audio selection over time and decreasing the volume of the other positioned audio selections over time, while all the audio selections continue to play in parallel within audio stream 332.

In one example, an attribute setting controller 322 manages a user interface for a user to select one or more preferences in each of attribute preference settings 320, posture based adjustment settings 342, and output interface settings 372. In one example, in addition to a user selecting preferences, attribute setting controller 322 may prompt a user to indicate whether the application of attribute preference settings 320, posture based adjustment settings 342, and output interface settings 372 results in an output that is expected by the user or monitors for user inputs that indicate whether the application of attribute preference settings 320, posture based adjustment settings 342, and output interface settings 372 results in an output that is expected by the user. In one embodiment, attribute setting controller 322 evaluates user responses and applies machine learning to train models that manage one or more of attribute preference settings 320, posture based adjustment settings 342, and output interface settings 372. Advantageously, by supporting an interface for a user to specify settings preferences, and by continuing to train the preferences based on user responses, attribute setting controller 322 supports adjustments to the position and characteristics of audio attributes of audio selections output in a simultaneous stream to tailor the parallel output of multiple content sources in 3D sound space 130 in a manner that generates a space filled with multiple voices in a manner that efficiently supports a particular user's preferences for engaging in selective hearing.

Figure 4:
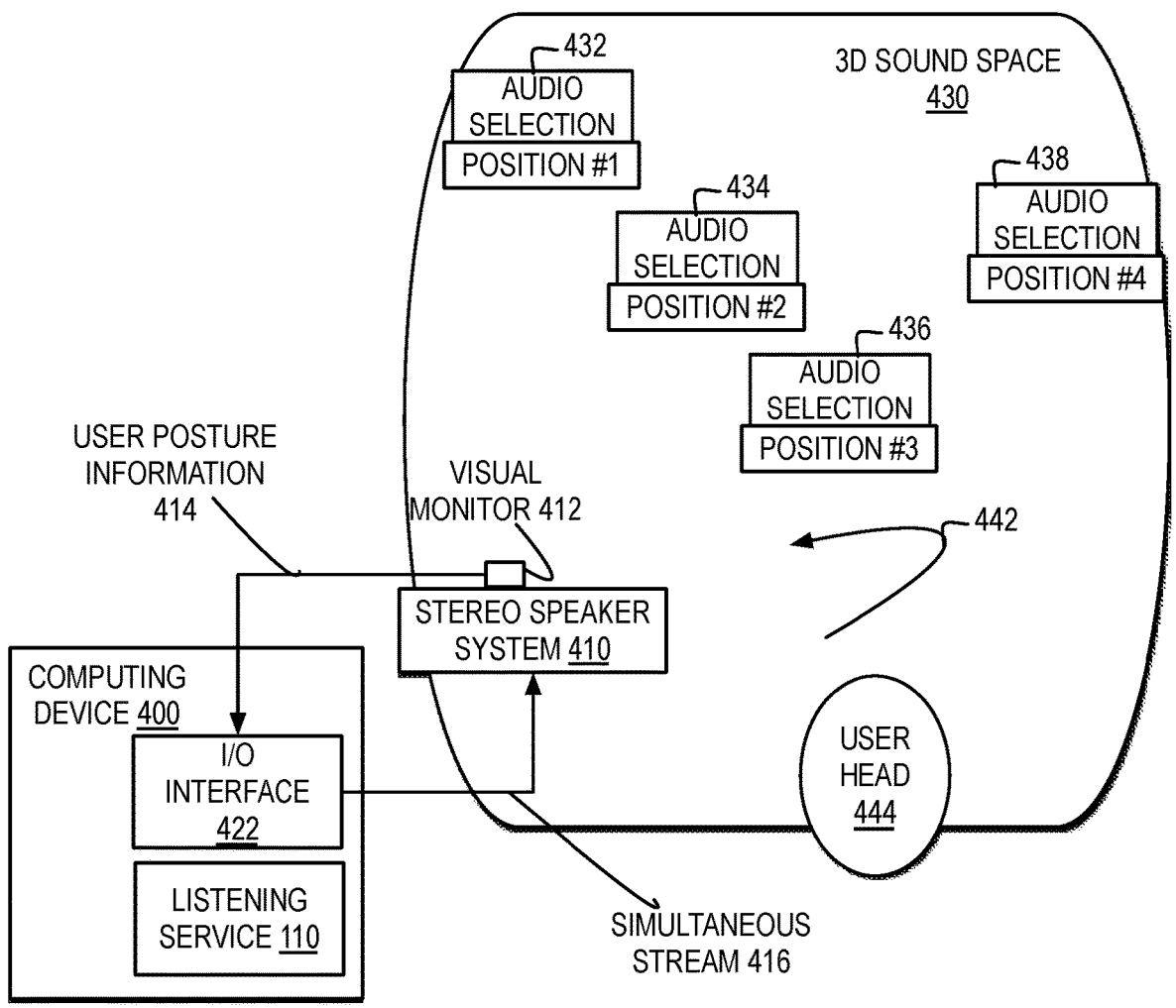
FIG. 4 illustrates a block diagram of one example of a computing device implementing a simultaneous speech play controller that is guided by user posture information detected by a visual monitor to tune into an audio selection positioned in a primary position, from among multiple content sources converted from text to speech and played in parallel.

FIG. 4 illustrates a block diagram of one example of a computing device implementing a simultaneous speech play controller that is guided by user posture information detected by a visual monitor to tune into an audio selection positioned in a primary position, from among multiple content sources converted from text to speech and played in parallel.

In one example, listening service 110 runs on computing device 400 and generates an audio stream that simultaneously streams multiple content selections converted from text into audio selections, such as audio selection 432, audio selection 434, audio selection 436 and audio selection 438. In the example, I/O interface 422 outputs a simultaneous stream 416 generated by listening service 110 to a stereo speaker system 410. Stereo speaker system 410 includes multiple speaker units controlled for outputting the audio tracts in simultaneous stream 416 within a 3D sound space 430 that is audibly detectable by a user present within the space.

In one embodiment, if a user listens to simultaneous stream 416 through stereo speaker system 410, a visual monitor 412 detects movement of user head 444. In the example, visual monitor 412 is positioned proximate to user head 444 to detect motion of user head 444 or other posture information that is motion indicating a selection, such as the motion of the user rotating user head 444 to the left, as illustrated at reference numeral 442. For example, visual monitor 412 represents one or more types of cameras or motion detectors for detecting particular types of motion within a recording area. In the example, visual monitor 412 is positioned proximate to components of stereo speaker system 410 and outputs user posture information 414 to I/O interface 422 of computing device 400 for application by listening service 110. Alternatively, visual monitor 412 is positioned independent of components of stereo speaker system 410, and may be a component of computing device 400, for outputting user posture information 414 for application by listening service 110.

Figure 5:
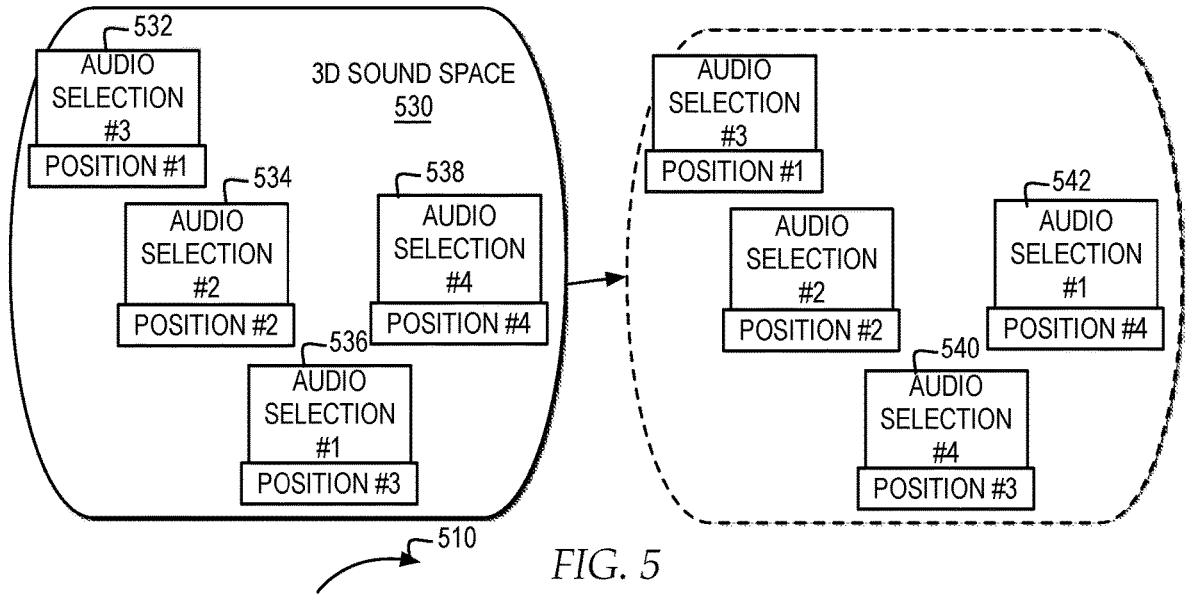
FIG. 5 illustrates a block diagram of one example of adjustments to positions of audio selections in a simultaneous stream of audio selections converted from multiple text content sources in response to detecting user posture information indicating a selection of a particular audio selection output within a 3D sound space.

FIG. 5 illustrates a block diagram of one example of adjustments to positions of audio selections in a simultaneous stream of audio selections converted from multiple text content sources in response to detecting user posture information indicating a selection of a particular audio selection output within a 3D sound space.

In one example, a 3D sound space 530 represents a sound space in which listening service 110 outputs a simultaneous stream 116 including an "audio selection #1", "audio selection #2", "audio selection #3", and "audio selection #4". In the example, as illustrated at reference numeral 532, "audio selection #3" is initially positioned at a "position #1" within 3D sound space 530. As illustrated at reference numeral 534, "audio selection #2" is initially positioned at a "position #2" within 3D sound space 530. As illustrated at reference numeral 536, "audio selection #1" is initially positioned at a "position #3" within 3D sound space 530. As illustrated at reference numeral 538, "audio selection #4" is initially positioned at a "position #4" within 3D sound space 530. In addition to each of the audio selections being distributed in different positions within 3D sound space 530, each of the audio selections may be output with audio attributes that audibly distinguish one or more characteristics of the respective audio selection.

In the example, listening service 110 detects user posture information 120 reflecting a user head movement rotated to the right, as illustrated at reference numeral 510. Advantageously, in response to the user head movement rotated to the right towards "audio selection #4" at reference numeral 538, listening service 110 selects to reposition "audio section #4" to the primary position of "position #1" as illustrated at reference numeral 540, to support a user applying selective hearing to further tune into "audio selection #4" by the positioning of "audio selection #4" in a primary position in front of the user. In addition, listening service 110 selects to reposition "audio section #1" to the open position of "position #4" as illustrated at reference numeral 542. In addition to repositioning "audio selection #1" and "audio selection #4", advantageously, listening service 110 also adjusts the audio attributes of one or more characteristics of each of the audio selections to audibly distinguish the "audio selection #4" in the primary position from the other audio selections, to support a user applying selective hearing to further tune into "audio selection #4" by increasing characteristics that increase the audible focus on "audio selection #4" and decreasing characteristics that decrease the audible focus on the other audio selections.

Figure 6:
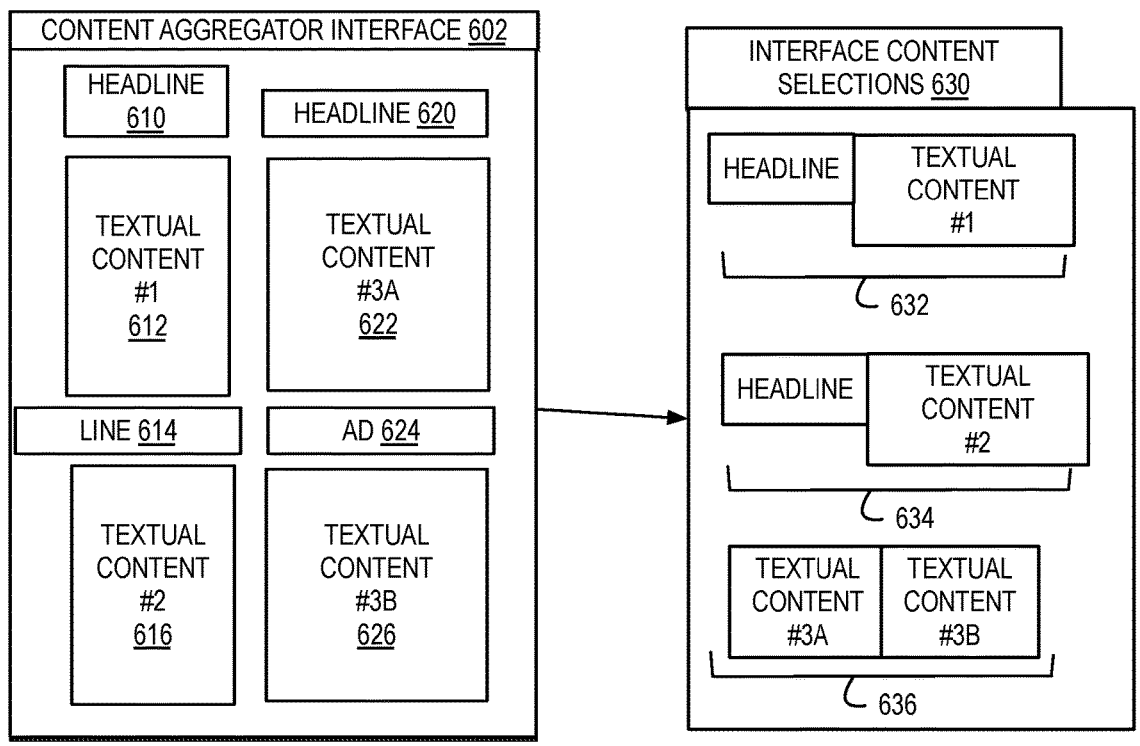
FIG. 6 illustrates one example of a block diagram of interface content selections identified from a content aggregator interface by a listening service for managing a simultaneous stream of text source content converted to speech and played in parallel.

FIG. 6 illustrates a block diagram of one example of interface content selections identified from a content aggregator interface by a listening service for managing a simultaneous stream of text source content converted to speech and played in parallel.

In one example, content aggregator interface 602 includes multiple types of textual content. Topic interface controller 370 applies output interface settings 372, which include at least one graphical characteristics that identifies a boundary between a text passage, to evaluate the graphical characteristics of the textual content in content aggregator interface 602 and identify one or more content sources in interface content selections 630, for conversion from text to speech and parallel play in a simultaneous stream.

In the example, content aggregator interface 602 includes four separate passages of textual content, illustrated as "textual content #1" 612, "textual content #2" 616, "textual content #3A" 622, and "textual content #3B" 626. In the example, topic interface controller 370 evaluates graphical characteristics identified by output interface settings 372 within content aggregator interface 602. Topic interface controller 370 identifies that headline 610 has a code style that reflects a boundary for starting "textual content #1" 612, line 614 is a graphical element that reflects a boundary for starting "textual content #2" 616, headline 620 has a code style that reflects a boundary for starting "textual content #3A" 622, and ad 624 is a graphical element that graphically separates "textual content #3A" 622 and "textual content #3B" 626, but is not a boundary between different text passages.

Advantageously, by topic interface controller 370 evaluating graphical characteristics within content aggregator 602 to identify boundaries between text passages, topic interface controller 370 is enabled to divide text passages from different content aggregators into separate content sources. In the example, topic interface controller 370 divides content aggregator interface 602 into three content sources in interface content selections 630 based on the boundaries identified between text passages. In the example, topic interface controller 370 divides a first content selection 632 from headline 610 and "textual content #1" 612, a second content selection 634 from headline 620 and "textual content #2" 616, and a third content selection 636 from "textual content #3A" and "textual content #3B".

Figure 7:
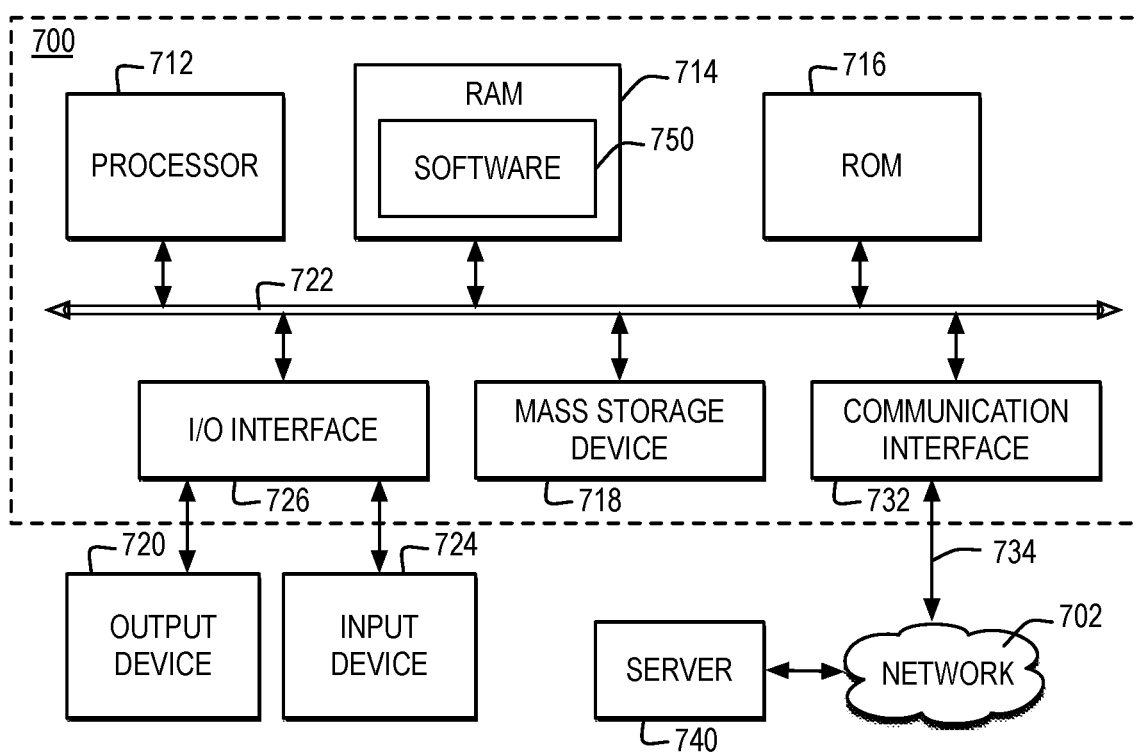
FIG. 7 illustrates one example of a computer system in which one embodiment of the invention may be implemented.

FIG. 7 illustrates a block diagram of one example of a computer system in which one embodiment of the invention may be implemented. The present invention may be performed in a variety of systems and combinations of systems, made up of functional components, such as the functional components described with reference to a computer system 700 and may be communicatively connected to a network, such as network 702.

Computer system 700 includes a bus 722 or other communication device for communicating information within computer system 700, and at least one hardware processing device, such as processor 712, coupled to bus 722 for processing information. Bus 722 preferably includes low-latency and higher latency paths that are connected by bridges and adapters and controlled within computer system 700 by multiple bus controllers. When implemented as a server or node, computer system 700 may include multiple processors designed to improve network servicing power.

Processor 712 may be at least one general-purpose processor that, during normal operation, processes data under the control of software 750, which may include at least one of application software, an operating system, middleware, and other code and computer executable programs accessible from a dynamic storage device such as random access memory (RAM) 714, a static storage device such as Read Only Memory (ROM) 716, a data storage device, such as mass storage device 718, or other data storage medium. Software 750 may include, but is not limited to, code, applications, protocols, interfaces, and processes for controlling one or more systems within a network including, but not limited to, an adapter, a switch, a server, a cluster system, and a grid environment.

Computer system 700 may communicate with a remote computer, such as server 740, or a remote client. In one example, server 740 may be connected to computer system 700 through any type of network, such as network 702, through a communication interface, such as network interface 732, or over a network link that may be connected, for example, to network 702.

In the example, multiple systems within a network environment may be communicatively connected via network 702, which is the medium used to provide communications links between various devices and computer systems communicatively connected. Network 702 may include permanent connections such as wire or fiber optics cables and temporary connections made through telephone connections and wireless transmission connections, for example, and may include routers, switches, gateways and other hardware to enable a communication channel between the systems connected via network 702. Network 702 may represent one or more of packet-switching based networks, telephony-based networks, broadcast television networks, local area and wire area networks, public networks, and restricted networks.

Network 702 and the systems communicatively connected to computer 700 via network 702 may implement one or more layers of one or more types of network protocol stacks which may include one or more of a physical layer, a link layer, a network layer, a transport layer, a presentation layer, and an application layer. For example, network 702 may implement one or more of the Transmission Control Protocol/Internet Protocol (TCP/IP) protocol stack or an Open Systems Interconnection (OSI) protocol stack. In addition, for example, network 702 may represent the worldwide collection of networks and gateways that use the TCP/IP suite of protocols to communicate with one another. Network 702 may implement a secure HTTP protocol layer or other security protocol for securing communications between systems.

In the example, network interface 732 includes an adapter 734 for connecting computer system 700 to network 702 through a link and for communicatively connecting computer system 700 to server 740 or other computing systems via network 702. Although not depicted, network interface 732 may include additional software, such as device drivers, additional hardware and other controllers that enable communication. When implemented as a server, computer system 700 may include multiple communication interfaces accessible via multiple peripheral component interconnect (PCI) bus bridges connected to an input/output controller, for example. In this manner, computer system 700 allows connections to multiple clients via multiple separate ports and each port may also support multiple connections to multiple clients.

In one embodiment, the operations performed by processor 712 may control the operations of flowchart of FIGS. 8-11 and other operations described herein. Operations performed by processor 712 may be requested by software 750 or other code or the steps of one embodiment of the invention might be performed by specific hardware components that contain hardwired logic for performing the steps, or by any combination of programmed computer components and custom hardware components. In one embodiment, one or more components of computer system 700, or other components, which may be integrated into one or more components of computer system 700, may contain hardwired logic for performing the operations of flowchart in FIGS. 8-11.

In addition, computer system 700 may include multiple peripheral components that facilitate input and output. These peripheral components are connected to multiple controllers, adapters, and expansion slots, such as input/output (I/O)

interface 726, coupled to one of the multiple levels of bus 722. For example, input device 724 may include, for example, a microphone, a video capture device, an image scanning system, a keyboard, a mouse, or other input peripheral device, communicatively enabled on bus 722 via I/O interface 726 controlling inputs. In addition, for example, output device 720 communicatively enabled on bus 722 via I/O interface 726 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 7, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 7 may vary. Furthermore, those of ordinary skill in the art will appreciate that the depicted example is not meant to imply architectural limitations with respect to the present invention.

Figure 8:
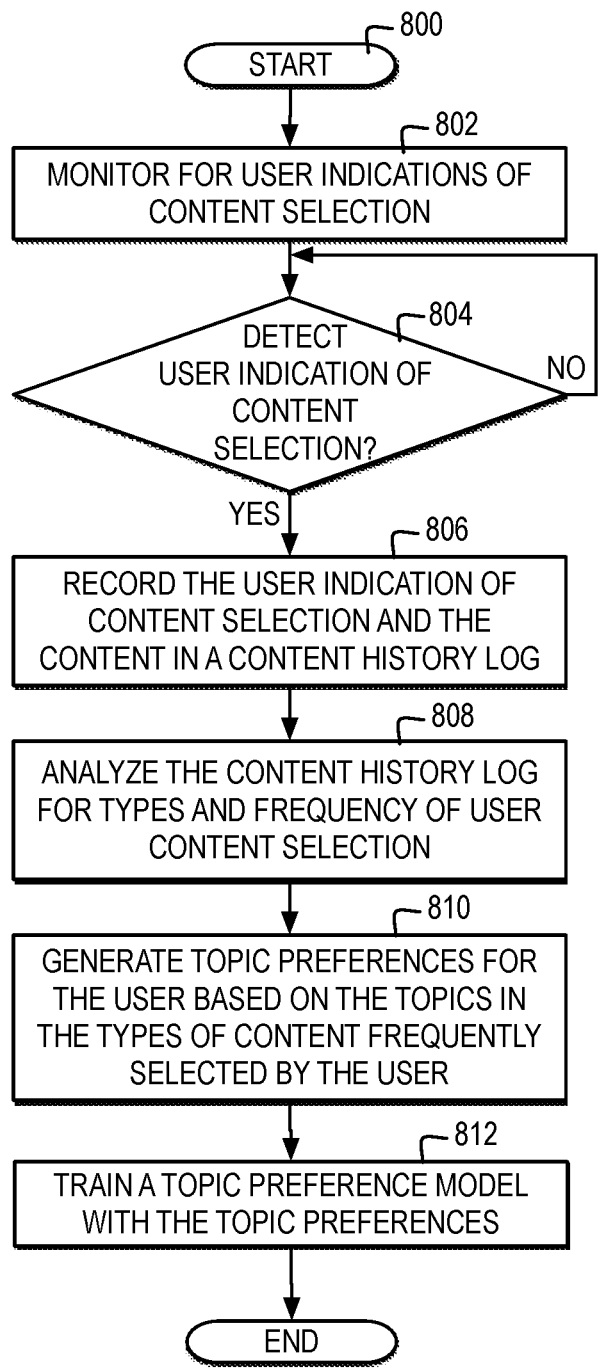
FIG. 8 illustrates a high-level logic flowchart of a process and computer program for tracking user topic preferences for application by a listening service to determine and prioritize content sources for conversion from text to speech and parallel play in a simultaneous stream.

FIG. 8 illustrates a high-level logic flowchart of a process and computer program for tracking user topic preferences for application by a listening service to determine and prioritize content sources for conversion from text to speech and parallel play in a simultaneous stream.

In one example, the process and computer program start at block 800 and thereafter proceed to block 802. Block 802 illustrates monitoring for user indications of content selection. Next, block 804 illustrates a determination whether a user indication of content selection is detected. At block 804, if a user indication of content selection is detected, then the process passes to block 806. Block 806 illustrates recording the user indication of content selection and the content in a content history log. Next, block 808 illustrates analyzing the content history log for types and frequency of user content selection. Thereafter, block 810 illustrates generating topic preferences for the user based on the topics in the types of content frequently selected by the user. Next, block 812 illustrates training a topic preference model with the topic preferences, and the process ends.

Figure 9:
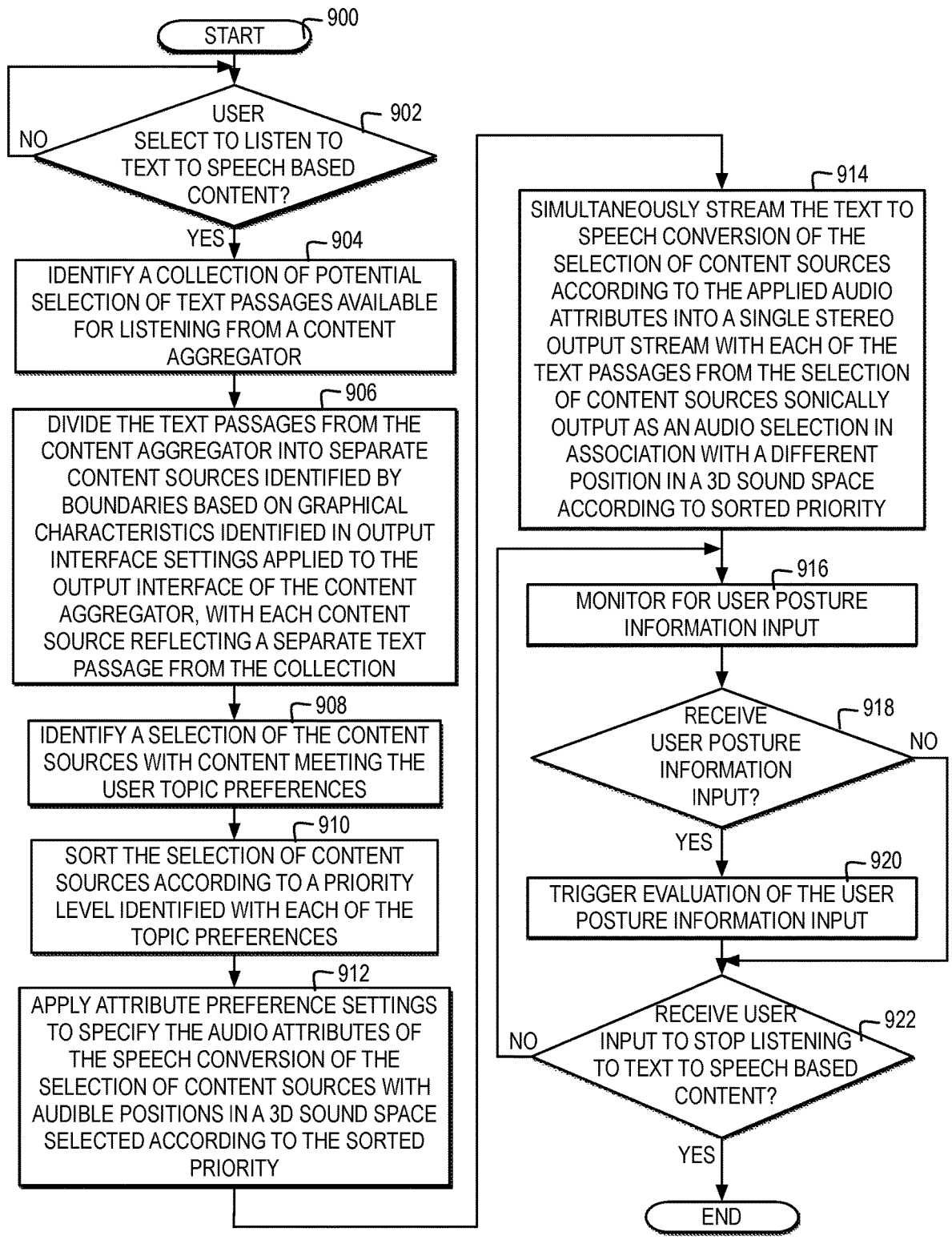
FIG. 9 illustrates a high-level logic flowchart of a process and computer program for managing a listening service implementing a simultaneous speech play controller that is guided by user posture information.

FIG. 9 illustrates a high-level logic flowchart of a process and computer program for managing a listening service implementing a simultaneous speech play controller that is guided by user posture information.

In one example, the process and computer program start at block 900 and thereafter proceed to block 902. Block 902 illustrates a determination whether a user selects to listen to text to speech based content. At block 902, if a user selects to listen to text to speech based content, then the process passes to block 904. Block 904 illustrates identifying a collection of potential selection of text passages available for listening from a content aggregator. Next, block 906 illustrates dividing the text passages from the content aggregator into separate content sources, identified by boundaries based on graphical characteristics identified in output interface settings applied to the output interface of the content aggregator, with each content source reflecting a separate text passage from the collection. Thereafter, block 908 illustrates identifying a selection of the content sources with content meeting the user topic preferences. Next, block 910 illustrates sorting the selection of content sources according to a priority level identified with each of the topic preferences. Thereafter, block 912 illustrates applying attribute preference settings to specify the audio attributes of the speech conversion of the selection of content sources, with audible positions in a 3D sound space selected according to the sorted priority. Next, block 914 illustrates simultaneously streaming the text to speech conversion of the selection of content sources according to the applied audio attributes into a single stereo output stream with each of the text passages from the selection of content sources sonically output as an audio selection in association with a different position in a 3D sound space according to sorted priority, and the process passes to block 916.

Block 916 illustrates monitoring for user posture information input. Next, block 918 illustrates a determination whether user posture information input is received. At block 918, if user posture information input is received, then the process passes to block 920. Block 920 illustrates triggering evaluation of the user posture information input, and the process passes to block 922. Returning to block 918, if user posture information input is not received, then the process passes to block 922.

Block 922 illustrates a determination whether user input to stop listening to text to speech based content. At block 922, if user input to stop listening to text to speech based content is received, then the process ends. Otherwise, at block 922, if user input to stop listening to text to speech based content is not received, then the process returns to block 916.

Figure 10:
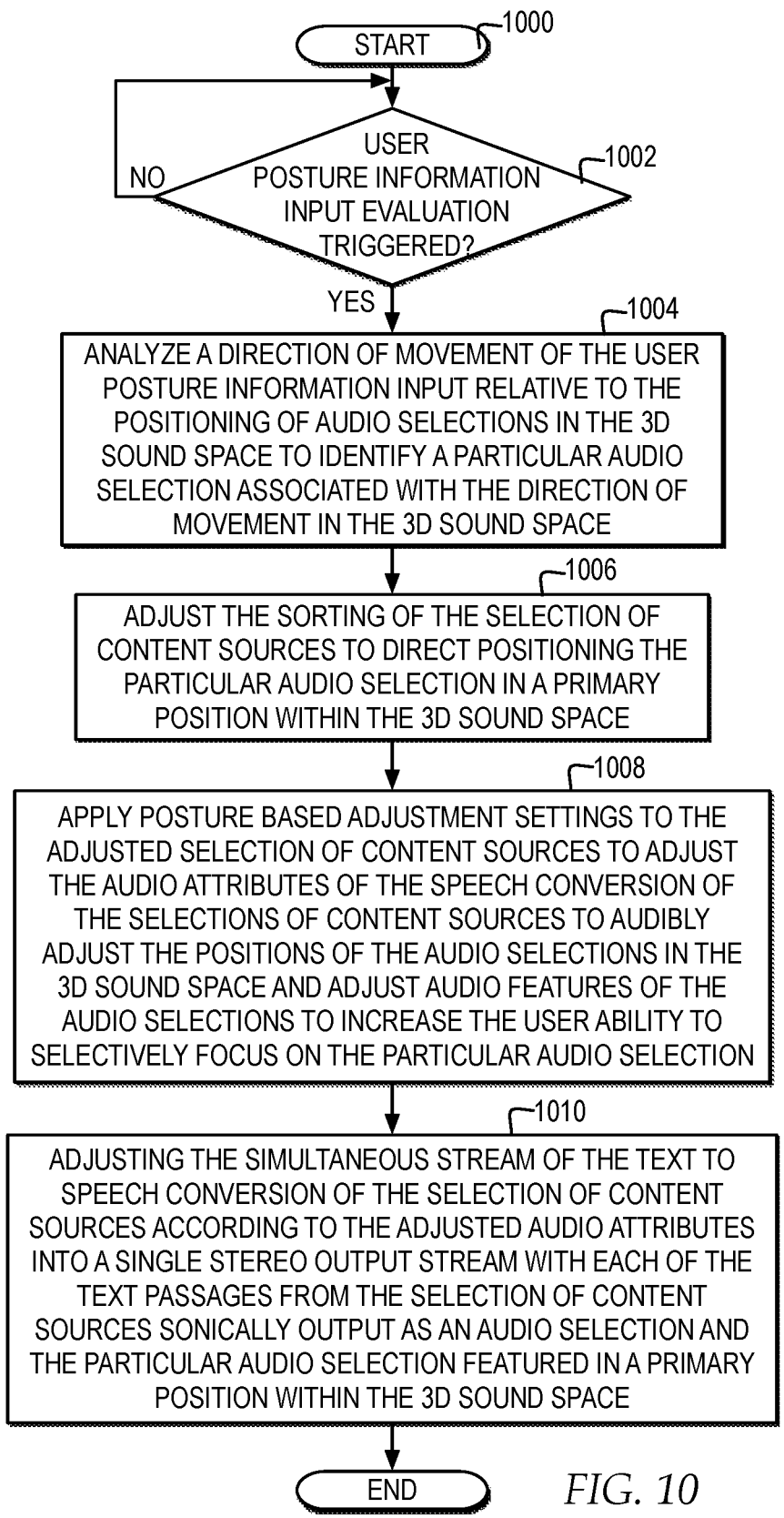
FIG. 10 illustrates one example of a high level logic flowchart of a process and program for managing a simultaneous speech play controller that is guided by user posture information to position an audio selection, converted from text to speech play of a particular content source from among multiple content sources provided by a content aggregator, in a primary position, from among multiple content sources converted from text to speech and played in parallel.

FIG. 10 illustrates a high-level logic flowchart of a process and computer program for managing a simultaneous speech play controller that is guided by user posture information to position an audio selection, converted from text to speech play of a particular content source from among multiple content sources provided by a content aggregator, in a primary position, from among multiple content sources converted from text to speech and played in parallel.

In one example, the process and computer program start at block 1000 and thereafter proceed to block 1002. Block 1002 illustrates a determination whether a user posture information input evaluation is triggered. At block 1002, if a user posture information input evaluation is triggered, then the process passes to block 1004. Block 1004 illustrates analyzing a direction of movement of the user posture information input relative to the positioning of audio selections in the 3D sound space to identify a particular audio selection associated with the direction of movement in the 3D sound space. Next, block 1006 illustrates adjusting the storing of the selection of content sources to direct positioning the particular audio selection in a primary position within the 3D sound space. Thereafter, block 1008 illustrates applying posture based adjustment settings to the adjusted selection of content sources to adjust the audio attributes of the speech conversion of the selections of content sources to audibly adjust the positions of the audio selections in the 3D sound space and adjust audio features of the audio selections to increase the user ability to selectively focus on the particular audio selection. Next, block 1010 illustrates adjusting the simultaneous stream of the text to speech conversion of the selection of content sources according to the adjusted audio attributes into a single stereo output stream with each of the text passages from the selection of content sources sonically output as an audio selection and the particular audio selection featured in a primary position within the 3D sound space, and the process ends.

Figure 11:
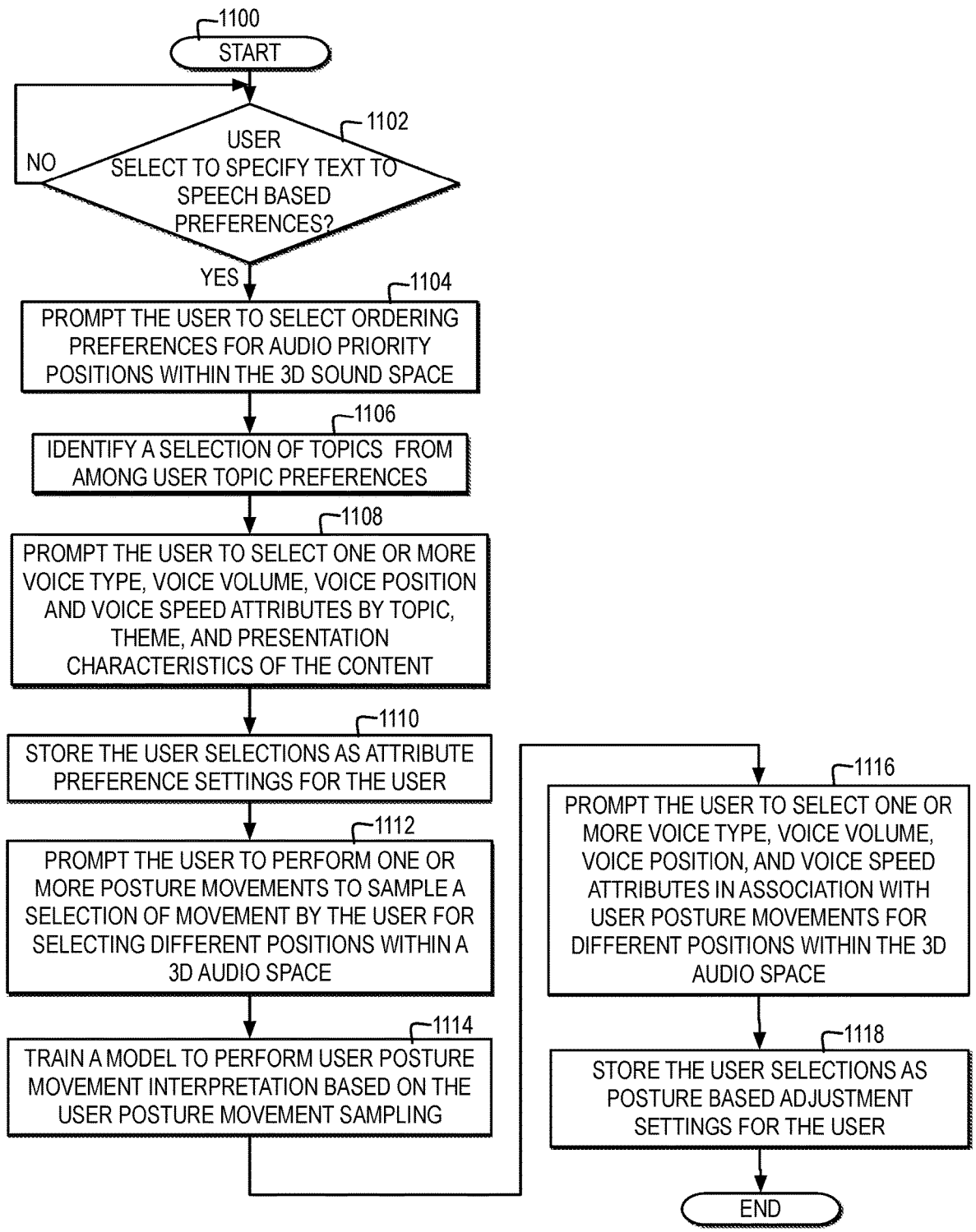
FIG. 11 illustrates one example of a high level logic flowchart of a process and program for setting user preferences for attributes preference settings, user posture movements, and posture based adjustment settings for application by a simultaneous speech play controller that is guided by user posture information.

FIG. 11 illustrates a high-level logic flowchart of a process and computer program for setting user preferences for attributes preference settings, user posture movements, and posture based adjustment settings for application by a simultaneous speech play controller that is guided by user posture information.

In one example, the process and computer program start at block 1100 and thereafter proceed to block 1102. Block 1102 illustrates a determination whether a user selects to specify text to speech based preferences. At block 1102, if a user selects to specify text to speech based preferences, then the process passes to block 1104. Block 1104 illustrates prompting the user to select ordering preferences for audio priority positions within the 3D sound space, including selecting a primary position within the multiple positions. Thereafter, block 1106 illustrates identifying a selection of topics from among user topic preferences. Next, block 1108 illustrates prompting the user to select one or more voice type, voice volume, voice position, and voice speed attributes by topic, theme and presentation characteristics of the content. Thereafter, block 1110 illustrates storing the user selections as attribute preference settings for the user, and the process passes to block 1112.

Block 1112 illustrates prompting the user to perform one or more posture movements to sample a selection of movement by the user for selecting different positions within a 3D audio space. Next, block 1114 illustrates training a cognitive model to perform user posture movement interpretation based on the user posture movement sampling. Next, block 1116 illustrates prompting the user to select one or more voice type, voice volume, voice position, and voice speed attributes in association with user posture movements for different positions within the 3D audio space. Thereafter, block 1118 illustrates storing the user selections as posture based adjustment settings for the user, and the process ends.

In one or more embodiments, a method, computer system, and computer program product are directed to identifying a plurality of content sources each comprising textual content, wherein the plurality of content sources are ordered by interest to a user. The method, computer system, and computer program product are directed to converting each of the plurality of content sources from the textual content to speech comprising a separate audio selection of a plurality of audio selections. The method, computer system, and computer program product are directed to applying, to each audio selection, one or more speech attributes to specify the audio attributes that select a respective position of the respective audio selection from among a plurality of positions within a multidimensional sound space and audibly distinguish one or more characteristics of the respective audio selection from other audio selections of the plurality of audio selections, wherein the respective position of the respective audio selection reflects a rank of the respective audio selection as ordered by interest. The method, computer system, and computer program product are directed to outputting a simultaneous stream of the plurality of audio selections to an audio output device for stereo play of the plurality of audio selections within the plurality of positions within the multidimensional sound space to the user with the plurality of positions reflecting the plurality of content sources ordered by interest. One advantage of applying one or more speech attributes to each audio selection to specify the audio attributes that select a respective position of the respective audio selection from among a plurality of positions within a multidimensional sound space and audibly distinguishing one or more characteristics of the respective audio selection from other audio selections of the plurality of audio selections is that the simultaneous stream of the audio selections provides an audio output that supports a user scanning through the content of multiple audio selections presented in parallel in different audible positions detectable by the user and identifying a topic that is of interest to the user from among the audio selections. One advantage of identifying the plurality of content sources ordered by interest to a user and specifying the audio attributes to select a respective position of an audio selection reflecting the rank of the respective audio selection as ordered by interest is that the simultaneous stream of the audio selections provides an audio output that positions content sources that are likely of most interest to the user in one or more primary positions that improves predictability for the user in scanning the audible positions that the audio selections in the one or more primary positions will be of highest interest to the user.

In addition, in one or more embodiments, the method, computer system, and computer program product directed to identifying the plurality of content sources each comprising textual content, wherein the plurality of content sources are ordered by interest to the user may also be directed to monitoring content accessed by a user for an indication of selection of the content by the user. The method, computer system, and computer program product may be further directed to responsive to detecting the indication of selection of the content by the user, recording the indication of the selection and the content in a content history log. The method, computer system, and computer program product may be further directed to analyzing the content history log for a frequency of at least one type of content. The method, computer system, and computer program product may be further directed to generating at least one topic preference for the user based on the at least one type of content and the respective frequency. The method, computer system, and computer program product may be further directed to training a cognitive model with the at least one topic preference and the respective frequency to identify other content comprising the at least one topic. The method, computer system, and computer program product may be further directed to, responsive to the user accessing a website comprising a plurality of text passages, identifying through the cognitive model the plurality of content sources from a selection of the plurality of text passages that comprise the at least one topic. The method, computer system, and computer program product may be further directed to ordering the plurality of content sources according to a respective priority level identified by the cognitive model based on the respective frequency of the at least one topic present in the respective content source of the plurality of content sources. One advantage of training a cognitive model with topic preferences and frequencies based on monitored used activity accessing and responding to content, and then selectively identifying and ordering content sources by the trained cognitive model is that the selection of content sources played in parallel in a simultaneous stream are ordered in audible position according to likelihood of interest for a particular user, to improve the efficiency of the particular user scanning through multiple audio selections streamed in parallel and finding at least one audible selection of interest to the user.

In addition, in one or more embodiments, the method, computer system, and computer program product directed to identifying the plurality of content sources each comprising textual content, wherein the plurality of content sources are ordered by interest to the user may also be directed to identifying an interface comprising a plurality of text passages available from a content aggregator. The method, computer system, and computer program product may be further directed to dividing the plurality of text passages from the content aggregator into separate content sources of the plurality of content sources based on output interface settings specifying at least one graphical characteristic for identifying boundaries between text passages in the interface. One advantage of identifying text passages available from a content aggregator and then dividing the text passages into content sources based on output interface settings specifying at least one graphical characteristic for identifying boundaries between text passages in the interface is that content sources are identified independent of any particular content aggregator interface such that the simultaneous stream is generated for content sources from multiple types of content aggregators and independent of whether the content aggregator outputs the text passages in an interface for conversion to speech.

In addition, in one or more embodiments, the method, computer system, and computer program product directed to applying, by the computer system, to each audio selection, the one or more speech attributes to specify the audio attributes that select the respective position of the respective audio selection from among the plurality of positions within the multidimensional sound space and audibly distinguish the one or more characteristics of the respective audio selection from other audio selections of the plurality of audio selections, wherein the respective position of the respective audio selection reflects the rank of the respective audio selection as ordered by interest may also be directed to applying, to each audio selection, the one or more speech attributes to specify the audio attributes for a particular position of the plurality of positions in a primary position in front of the user within the multidimensional sound space for a particular audio selection converted from a particular content source with a highest rank as ordered by interest. One advantage of applying the one or more speech attributes to specify the audio attributes for a particular audio selection with a highest rank as ordered by interest in a primary position in front of the user within the multidimensional sound space is that the user is provided with an audio output with multiple audio selections in different positions, with the audio selection most likely of interest to the user positioned predictably in a position in front of the user to improve the efficiency with which a user determines an order to scan and focus in on each of the audio selections played in parallel.

In addition, in one or more embodiments, the method, computer system, and computer program product may also be directed to monitoring for input indicating a user posture change. The method, computer system, and computer program product may also be directed to, responsive to detecting the input indicating the user posture change, analyzing a direction of movement of the user posture change relative to a positioning of the plurality of audio selections in the multidimensional sound space comprising a 3D sound space. The method, computer system, and computer program product may also be directed to identifying a particular audio selection from among the plurality of audio selections selected by the user based on the direction of movement of the user posture change relative to the positioning of the plurality of audio selections in the 3D sound space. The method, computer system, and computer program product may also be directed to applying, to each audio selection, one or more updated speech attributes to specify the audio attributes that select the respective position of the respective audio selection from among the plurality of positions within the 3D sound space and audibly distinguish the one or more characteristics of the respective audio selection from other audio selections of the plurality of audio selections, wherein the particular audio selection is moved to a primary position in front of the user within the 3D sound space and a volume of the particular audio selection is increased relative to the other audio selections of the plurality of audio selections. One advantage of monitoring for input indicating a user posture change and detecting the direction of movement in the user posture change relative to the positioning of audio selection in the multidimensional sound space is that a user provides an input to focusing in on a particular audio selection by a minimal motion that allows the user to select to focus on a particular audio selection from among multiple audio selections in a simultaneous stream in a hands-free manner and without requiring an precise movement.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method comprising:
    identifying, by a computer system, a plurality of content sources each comprising one or more textual content, wherein the plurality of content sources are ordered by interest to a user;
    converting, by the computer system, each of the plurality of content sources from the one or more textual content to speech, wherein each of the plurality of content sources comprises a separate audio selection of an audio selection;
    applying, by the computer system, to each audio selection, one or more speech attributes to specify the audio attributes that select a respective position of the respective audio selection from among a plurality of positions within a multidimensional sound space and audibly distinguish one or more characteristics of the respective audio selection from other audio selections of the audio selection, wherein the respective position of the respective audio selection reflects a rank of the respective audio selection as ordered by interest; and
    outputting, by the computer system, a simultaneous stream of the audio selection to an audio output device for stereo play of the audio selection within the plurality of positions within the multidimensional sound space to the user with the plurality of positions reflecting the plurality of content sources ordered by interest.

2. The method according to claim 1, wherein identifying, by the computer system, the plurality of content sources each comprising textual content, wherein the plurality of content sources are ordered by interest to the user further comprises:

monitoring, by the computer system, content accessed by a user for an indication of selection of the content by the user;

responsive to detecting the indication of selection of the content by the user, recording, by the computer system, the indication of the selection and the content in a content history log;

analyzing, by the computer system, the content history log for a frequency of at least one type of content;

generating, by the computer system, at least one topic preference for the user based on the at least one type of content and the respective frequency;

training, by the computer system, a cognitive model with the at least one topic preference and the respective frequency to identify other content comprising the at least one topic; and responsive to the user accessing a website comprising a plurality of text passages, identifying, by the computer system, through the cognitive model the plurality of content sources from a selection of the plurality of text passages that comprise the at least one topic; and ordering, by the computer system, the plurality of content sources according to a respective priority level identified by the cognitive model based on the respective frequency of the at least one topic present in the respective content source of the plurality of content sources.

3. The method according to claim 1, wherein identifying, by the computer system, the plurality of content sources each comprising textual content, wherein the plurality of content sources are ordered by interest to the particular user further comprises:

identifying, by the computer system, an interface comprising a plurality of text passages available from a content aggregator; and dividing, by the computer system, the plurality of text passages from the content aggregator into separate content sources of the plurality of content sources based on output interface settings specifying at least one graphical characteristic for identifying boundaries between text passages in the interface.

4. The method according to claim 1, wherein applying, by the computer system, to each audio selection, the one or more speech attributes to specify the audio attributes that select the respective position of the respective audio selection from among the plurality of positions within the multidimensional sound space and audibly distinguish the one or more characteristics of the respective audio selection from other audio selections of the audio selection, wherein the respective position of the respective audio selection reflects the rank of the respective audio selection as ordered by interest, further comprises:

applying, by the computer system, to each audio selection, the one or more speech attributes to distinguish the one or more characteristics, the one or more speech attributes comprising one or more of one or more voice type attributes, one or more voice volume attributes, and one or more voice speed attributes.

5. The method according to claim 4, wherein applying, by the computer system, to each audio selection, the one or more speech attributes comprising one or more of the one or more voice type attributes, the one or more voice volume attributes, the one or more voice position attributes, and the one or more voice speed attributes further comprises:

selecting, by the computer system, for each audio selection, the one or more speech attributes based on attribute preference settings specified by topic, by graphical presentation characteristics of the respective content source, and by theme.

6. The method according to claim 1, wherein applying, by the computer system, to each audio selection, the one or more speech attributes to specify the audio attributes that select the respective position of the respective audio selection from among the plurality of positions within the multidimensional sound space and audibly distinguish the one or more characteristics of the respective audio selection from other audio selections of the audio selection, wherein the respective position of the respective audio selection reflects the rank of the respective audio selection as ordered by interest, further comprises:

applying, by the computer system, to each audio selection, the one or more speech attributes to specify the audio attributes for a particular position of the plurality of positions in a primary position in front of the user within the multidimensional sound space for a particular audio selection converted from a particular content source with a highest rank as ordered by interest.

7. The method according to claim 1, further comprising:

monitoring, by the computer system, for input indicating a user posture change;

responsive to detecting the input indicating the user posture change, analyzing, by the computer system, a direction of movement of the user posture change relative to a positioning of the audio selection in the multidimensional sound space comprising a 3D sound space;

identifying, by the computer system, a particular audio selection from among the audio selection selected by the user based on the direction of movement of the user posture change relative to the positioning of the audio selection in the 3D sound space; and applying, by the computer system, to each audio selection, one or more updated speech attributes to specify the audio attributes that select the respective position of the respective audio selection from among the plurality of positions within the 3D sound space and audibly distinguish the one or more characteristics of the respective audio selection from other audio selections of the audio selection, wherein the particular audio selection is moved to a primary position in front of the user within the 3D sound space and a volume of the particular audio selection is increased relative to the other audio selections of the audio selection.

8. The method according to claim 7, wherein monitoring, by the computer system, for input indicating the user posture change further comprises:

receiving, by the compute system, an output from a gyroscope that measures an angular velocity measuring a rotational movement of a head of a user listening to an audio output of the simultaneous stream.

9. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:

program instructions to identify a plurality of content sources each comprising one or more textual content, wherein the plurality of content sources are ordered by interest to a user;

program instructions to convert each of the plurality of content sources from the one or more textual content to speech, wherein each of the plurality of content sources comprises a separate audio selection of an audio selection;

program instructions to apply, to each audio selection, one or more speech attributes to specify the audio attributes that select a respective position of the respective audio selection from among a plurality of positions within a multidimensional sound space and audibly distinguish one or more characteristics of the respective audio selection from other audio selections of the audio selection, wherein the respective position of the respective audio selection reflects a rank of the respective audio selection as ordered by interest; and program instructions to output a simultaneous stream of the audio selection to an audio output device for stereo play of the audio selection within the plurality of positions within the multidimensional sound space to the user with the plurality of positions reflecting the plurality of content sources ordered by interest.

10. The computer system according to claim 9, wherein the stored program instructions to identify the plurality of content sources each comprising textual content, wherein the plurality of content sources are ordered by interest to the user further comprise:

program instructions to monitor content accessed by a user for an indication of selection of the content by the user;

program instructions to, responsive to detecting the indication of selection of the content by the user, record the indication of the selection and the content in a content history log;

program instructions to analyze the content history log for a frequency of at least one type of content;

program instructions to generate at least one topic preference for the user based on the at least one type of content and the respective frequency;

program instructions to train a cognitive model with the at least one topic preference and the respective frequency to identify other content comprising the at least one topic; and program instructions to, responsive to the user accessing a website comprising a plurality of text passages, identify, through the cognitive model, the plurality of content sources from a selection of the plurality of text passages that comprise the at least one topic; and program instructions to order the plurality of content sources according to a respective priority level identified by the cognitive model based on the respective frequency of the at least one topic present in the respective content source of the plurality of content sources.

11. The computer system according to claim 9, wherein the stored program instructions to identify the plurality of content sources each comprising textual content, wherein the plurality of content sources are ordered by interest to the particular user further comprise:

program instructions to identify an interface comprising a plurality of text passages available from a content aggregator; and program instructions to divide the plurality of text passages from the content aggregator into separate content sources of the plurality of content sources based on output interface settings specifying at least one graphical characteristic for identifying boundaries between text passages in the interface.

12. The computer system according to claim 9, wherein the stored program instructions to apply, to each audio selection, the one or more speech attributes to specify the audio attributes that select the respective position of the respective audio selection from among the plurality of positions within the multidimensional sound space and audibly distinguish the one or more characteristics of the respective audio selection from other audio selections of the audio selection, wherein the respective position of the respective audio selection reflects the rank of the respective audio selection as ordered by interest, further comprise:

program instructions to apply, to each audio selection, the one or more speech attributes to distinguish the one or more characteristics, the one or more speech attributes comprising one or more of one or more voice type attributes, one or more voice volume attributes, and one or more voice speed attributes.

13. The computer system according to claim 12, wherein the stored program instructions to apply, to each audio selection, the one or more speech attributes comprising one or more of the one or more voice type attributes, the one or more voice volume attributes, the one or more voice position attributes, and the one or more voice speed attributes further comprise:

program instructions to select, for each audio selection, the one or more speech attributes based on attribute preference settings specified by topic, by graphical presentation characteristics of the respective content source, and by theme.

14. The computer system according to claim 9, wherein the stored program instructions to apply, to each audio selection, the one or more speech attributes to specify the audio attributes that select the respective position of the respective audio selection from among the plurality of positions within the multidimensional sound space and audibly distinguish the one or more characteristics of the respective audio selection from other audio selections of the audio selection, wherein the respective position of the respective audio selection reflects the rank of the respective audio selection as ordered by interest, further comprise:

program instructions to apply, to each audio selection, the one or more speech attributes to specify the audio attributes for a particular position of the plurality of positions in a primary position in front of the user within the multidimensional sound space for a particular audio selection converted from a particular content source with a highest rank as ordered by interest.

15. The computer system according to claim 9, wherein the stored program instructions further comprise:

program instructions to monitor for input indicating a user posture change;

program instructions to, responsive to detecting the input indicating the user posture change, analyze a direction of movement of the user posture change relative to a positioning of the audio selection in the multidimensional sound space comprising a 3D sound space;

program instructions to identify a particular audio selection from among the audio selection selected by the user based on the direction of movement of the user posture change relative to the positioning of the audio selection in the 3D sound space; and program instructions to apply, to each audio selection, one or more updated speech attributes to specify the audio attributes that select the respective position of the respective audio selection from among the plurality of positions within the 3D sound space and audibly distinguish the one or more characteristics of the respective audio selection from other audio selections of the audio selection, wherein the particular audio selection is moved to a primary position in front of the user within the 3D sound space and a volume of the particular audio selection is increased relative to the other audio selections of the audio selection.

16. The computer system according to claim 15, wherein the stored program instructions to monitor for input indicating the user posture change further comprise:
program instructions to receive an output from a gyroscope that measures an angular velocity measuring a rotational movement of a head of a user listening to an audio output of the simultaneous stream.

17. A computer program product, the computer program product comprising a computer readable storage medium having program instructions embodied therewith, wherein the computer readable storage medium is not a transitory signal per se, the program instructions executable by a computer to cause the computer to:
identify, by a computer, a plurality of content sources each comprising one or more textual content, wherein the plurality of content sources are ordered by interest to a user;
convert, by the computer, each of the plurality of content sources from the one or more textual content to speech, wherein each of the plurality of content sources comprises a separate audio selection of an audio selection;
apply, by the computer, to each audio selection, one or more speech attributes to specify the audio attributes that select a respective position of the respective audio selection from among a plurality of positions within a multidimensional sound space and audibly distinguish one or more characteristics of the respective audio selection from other audio selections of the audio selection, wherein the respective position of the respective audio selection reflects a rank of the respective audio selection as ordered by interest; and
output, by the computer, a simultaneous stream of the audio selection to an audio output device for stereo play of the audio selection within the plurality of positions within the multidimensional sound space to the user with the plurality of positions reflecting the plurality of content sources ordered by interest.

18. The computer program product according to claim 17, further comprising the program instructions executable by a computer to cause the computer to:
monitor, by the computer, content accessed by a user for an indication of selection of the content by the user;
responsive to detecting the indication of selection of the content by the user, record, by the computer, the indication of the selection and the content in a content history log;
analyze, by the computer, the content history log for a frequency of at least one type of content;
generate, by the computer, at least one topic preference for the user based on the at least one type of content and the respective frequency;
train, by the computer, a cognitive model with the at least one topic preference and the respective frequency to identify other content comprising the at least one topic; and
responsive to the user accessing a website comprising a plurality of text passages, identify, by the computer, through the cognitive model the plurality of content sources from a selection of the plurality of text passages that comprise the at least one topic; and
order, by the computer, the plurality of content sources according to a respective priority level identified by the cognitive model based on the respective frequency of the at least one topic present in the respective content source of the plurality of content sources.

19. The computer program product according to claim 17, further comprising the program instructions executable by a computer to cause the computer to:
identify, by the computer, an interface comprising a plurality of text passages available from a content aggregator; and
divide, by the computer, the plurality of text passages from the content aggregator into separate content sources of the plurality of content sources based on output interface settings specifying at least one graphical characteristic for identifying boundaries between text passages in the interface.

20. The computer program product according to claim 17, further comprising the program instructions executable by a computer to cause the computer to:
apply, by the computer, to each audio selection, the one or more speech attributes to distinguish the one or more characteristics, the one or more speech attributes comprising one or more of one or more voice type attributes, one or more voice volume attributes, and one or more voice speed attributes.

* * * * *